United States Patent
Magin et al.

(10) Patent No.: US 9,722,729 B2
(45) Date of Patent: Aug. 1, 2017

(54) EXTRACTING ZERO CROSS INFORMATION IN A POWERLINE COMMUNICATION DEVICE

(71) Applicant: QUALCOMM Incorporated, San Diego, CA (US)

(72) Inventors: Gregory Allen Magin, Ocala, FL (US); Faisal Mahmood Shad, Ocala, FL (US); Lawrence Winston Yonge, III, Summerfield, FL (US); Sanjay Kasturia, Los Altos Hills, CA (US); Niranjan Anand Talwalkar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 14/042,626

(22) Filed: Sep. 30, 2013

(65) Prior Publication Data

US 2014/0355697 A1 Dec. 4, 2014

Related U.S. Application Data

(60) Provisional application No. 61/830,036, filed on May 31, 2013.

(51) Int. Cl.
*H04L 1/00* (2006.01)
*H04B 3/54* (2006.01)
*H04B 3/56* (2006.01)

(52) U.S. Cl.
CPC ............. *H04L 1/004* (2013.01); *H04B 3/54* (2013.01); *H04B 3/542* (2013.01); *H04B 3/56* (2013.01);

(Continued)

(58) Field of Classification Search
None
See application file for complete search history.

(56) References Cited

U.S. PATENT DOCUMENTS

| 8,324,761 B2 | 12/2012 | Elliott et al. |
| 8,674,539 B1 * | 3/2014 | Magin ................. H02J 13/0044 307/1 |

(Continued)

FOREIGN PATENT DOCUMENTS

| WO | 2006096987 A1 | 9/2006 |
| WO | 2012044542 | 4/2012 |
| WO | 2014194103 | 12/2014 |

OTHER PUBLICATIONS

"PCT Application No. PCT/US2014/040039 Invitation to Pay Additional Fees", Sep. 15, 2014, 6 pages.

(Continued)

*Primary Examiner* — Jared Fureman
*Assistant Examiner* — James Evans
(74) *Attorney, Agent, or Firm* — DeLizio Law, PLLC

(57) ABSTRACT

A powerline communication (PLC) device can be configured to execute functionality for zero cross sampling and detection. When the PLC device is directly coupled to a high-voltage PLC network, the PLC device can comprise printed safety capacitors in series with a high-voltage input AC powerline signal to safely couple the high-voltage AC powerline signal to the low-voltage processing circuit. The PLC device can also comprise an ADC to sample a scaled AC powerline signal and to obtain zero cross information. When the PLC device is part of an embedded PLC application, dynamic loading can affect the integrity of a low voltage zero cross signal that is used to extract zero cross information. After digitizing the zero cross signal, the PLC device can execute functionality to minimize/eliminate voltage drops caused by dynamic loading and obtain the zero cross information.

17 Claims, 10 Drawing Sheets

(52) U.S. Cl.
CPC ............... *H04B 2203/542* (2013.01); *H04B 2203/5408* (2013.01); *H04B 2203/5425* (2013.01); *H04B 2203/5483* (2013.01); *H04B 2203/5491* (2013.01)

(56) References Cited

U.S. PATENT DOCUMENTS

| | | | |
|---|---|---|---|
| 2008/0116996 A1* | 5/2008 | Wasaki | H03H 7/427 333/175 |
| 2008/0278296 A1 | 11/2008 | Noh | |
| 2011/0109320 A1 | 5/2011 | Curt et al. | |
| 2011/0175712 A1 | 7/2011 | Franco et al. | |
| 2012/0230074 A1* | 9/2012 | Barnett | H04B 3/56 363/126 |
| 2013/0085692 A1 | 4/2013 | Lee et al. | |

OTHER PUBLICATIONS

"PCT Application No. PCT/US2014/040039 International Search Report", Dec. 16, 2014, 18 pages.

* cited by examiner

EXTRACTING ZERO CROSS INFORMATION IN A POWERLINE COMMUNICATION DEVICE

RELATED MATTERS

This application claims the priority benefit of U.S. provisional application No. 61/830,036 filed on May 31, 2013.

BACKGROUND

Embodiments of the inventive subject matter generally relate to the field of communication networks and, more particularly, to extracting zero cross information in a powerline communication (PLC) device.

Electric power is transmitted over transmission lines at a high voltage, and is distributed to buildings and other structures at much lower voltages using electric power lines. Besides providing electric power, the electric power lines can also be used to implement powerline communications within buildings and other structures. Powerline communications can allow electronic devices to connect to each other and to the Internet. For example, HomePlug® devices can be used for wired broadband networking using IEEE 1901 and HomePlug AV standards for broadband over powerline communication. HomePlug AV and IEEE 1901 standards compatible PLC devices can implement AC line cycle zero cross detection techniques. AC line cycle zero cross detection can be used by the PLC devices for proper synchronization with the AC line cycle.

SUMMARY

Various embodiments for extracting zero cross information in a powerline communication (PLC) circuit are disclosed. In one embodiment, a network device comprises a printed capacitor coupling unit and a zero cross detector coupled with the printed capacitor coupling unit. The printed capacitor coupling unit is configured to receive an AC powerline signal at a first voltage level from a powerline communication network. The printed capacitor coupling unit is also configured to provide the AC powerline signal at a second voltage level to a zero cross comparator unit of the network device, wherein the second voltage level is lower than the first voltage level. The zero cross detector comprises an analog-to-digital conversion (ADC) unit coupled with a digital processing unit. The ADC unit is configured to convert an analog representation of the AC powerline signal to a digital representation of the AC powerline signal. The digital processing unit is configured to extract zero cross information from the digital representation of the AC powerline signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
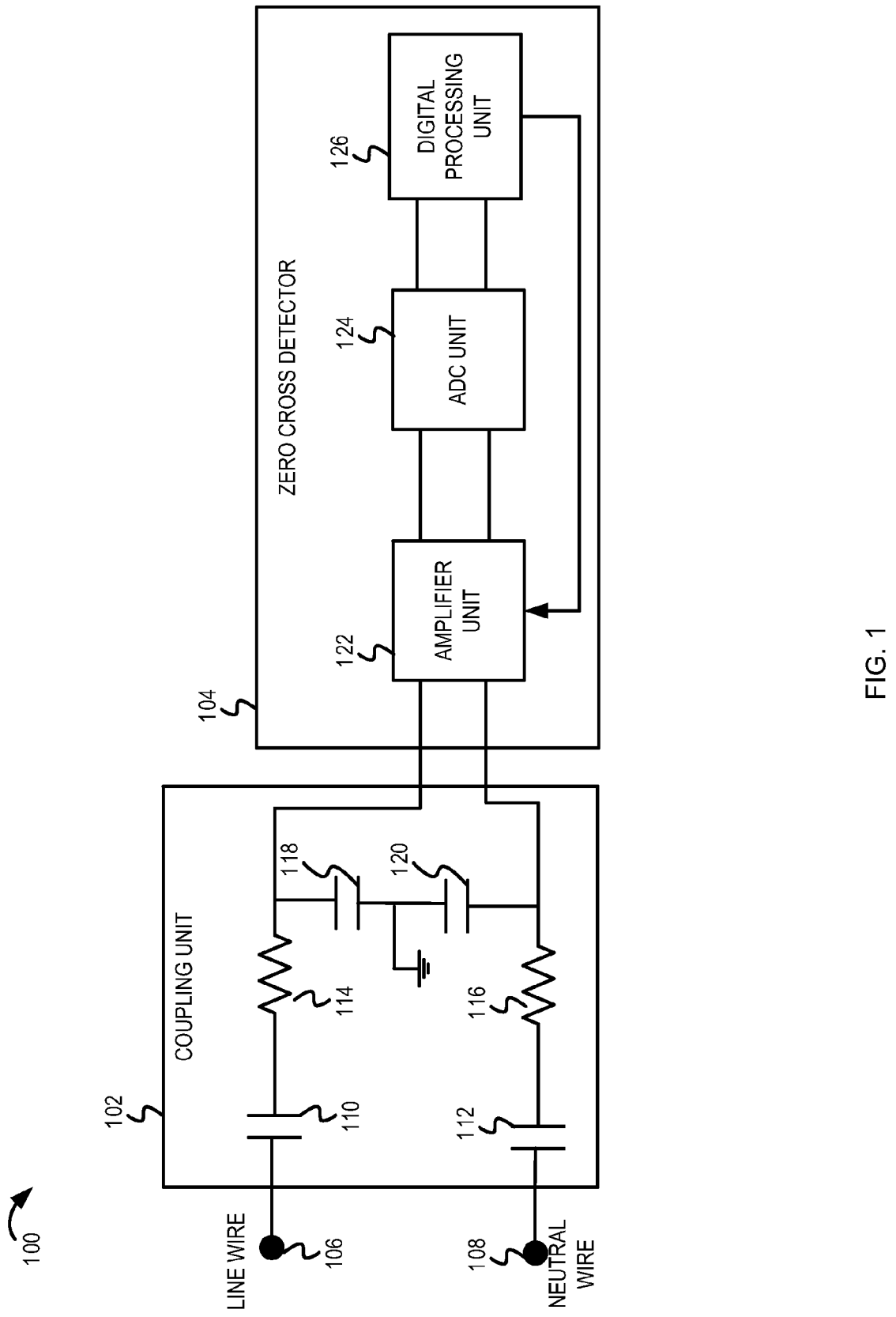
FIG. 1 is an example PLC circuit including a coupling unit and a zero cross detector.

The description that follows includes exemplary systems, methods, techniques, instruction sequences, and computer program products that embody techniques of the present inventive subject matter. However, it is understood that the described embodiments may be practiced without specific details disclosed. For example, although in some embodiments the printed capacitor coupling mechanisms can be implemented in conjunction with a digital zero cross detector, embodiments are not so limited. In other embodiments, the printed capacitor coupling mechanisms and the digital zero cross detector can each be implemented separately. In other instances, well-known instruction instances, protocols, structures, and techniques have not been shown in detail in order not to obfuscate the description.

A powerline network is a shared communication network in which multiple powerline devices are coupled to the powerline medium. In addition to providing electric power, the powerline network (also referred to as a PLC network) may also facilitate exchange of communications across PLC-capable devices. Network devices that draw power from the powerline network (e.g., home appliances, power supplies, etc.) can cause noise/interference on the PLC network, thereby interfering with PLC signals exchanged between the PLC-capable devices. Typically, changes in power consumption of the network devices coupled to the PLC network can cause an undesirable outcome. For example, components in the PLC-capable devices and other network devices coupled to the PLC network can draw varying levels of current at various times, in particular, during power-up of the components. This may result in undesirable voltage drops that can be of the same peak-to-peak amplitude and frequency as a zero cross component of the PLC signal. As a result, the undesirable voltage drops in the PLC signal may interfere with the zero cross component of the PLC signal, making it difficult to recover zero cross information. A PLC-capable device typically uses an opto-coupler to safely couple a high-voltage AC powerline signal to a low-voltage processing circuit of the PLC-capable device. The opto-coupler may comprise a light source (e.g., a light emitting diode or LED) and a photo-detector (e.g., a phototransistor). Furthermore, embedded PLC applications may employ a 1-bit comparator for zero cross detection to detect whether the AC powerline signal is above or below a zero cross threshold. However, an opto-coupler can be expensive to implement and can utilize a significant amount of power to switch ON/OFF the light source during operation. Moreover, zero cross detection using the opto-coupler and the 1-bit comparator can be complex and use a relatively large area on the printed circuit board (PCB), can be sensitive to various sources of noise and interference on the PLC network, and can have limited ability to correct for errors in estimates of the zero cross information.

Various embodiments for powerline zero cross sampling and detection are disclosed. In some embodiments, printed safety capacitors can be coupled in series with output terminals of a high-voltage PLC network to safely couple a high-voltage AC powerline signal to a low-voltage processing circuit of a PLC-capable network device. Typically, "high-voltage" can refer to nominal 120 V/240 V powerline signal (supplied by PLC networks in the United States) and 230 V/240 V powerline signal (supplied by PLC networks in Europe). Typically, the "low-voltage" processing circuits can process signals that are of the order of milliVolts (mV). In some embodiments, an analog-to-digital converter (ADC) can be used for zero cross detection. The ADC can sample a scaled version of the AC powerline signal at a predetermined and/or configurable sampling rate. The resultant digital representation of the AC powerline signal can be filtered and processed to obtain estimates of powerline cycle zero crossing time instants (also referred to as zero cross information), as will be further described with reference to FIGS. 1-3. The ADC-based zero cross detector can also be used in embedded PLC applications where the AC powerline signal is carried over the same wire pair that provides current, sometimes in the form of a DC signal, to the PLC-capable device from an external power supply. In this embodiment, the ADC-based zero cross detector can also implement an error correction unit to minimize distortion from low frequency signals (e.g., the zero cross signal), and can provide a clean and stable input zero cross signal to obtain powerline cycle zero crossing time instants, as will be further described with reference to FIGS. 4-9. The mechanism for ADC-based zero cross signal detection can reduce the cost of stand-alone and embedded PLC devices, reduce external component count and PCB area, improve performance, and increase flexibility for emerging applications.

FIG. 1 depicts an example PLC circuit 100 including a coupling unit 102 and a zero cross detector 104. The coupling unit 102 couples an AC powerline signal received from a PLC network to the zero cross detector 104. In some embodiments, the PLC circuit 100 may be implemented in a standalone or dedicated PLC device (e.g., a PLC adapter module) that directly connects to an AC outlet of a PLC network (not shown). FIG. 1 depicts a line wire 106 and a neutral wire 108 of the AC outlet. The coupling unit 102 is connected to the line wire 106 and the neutral wire 108. The coupling unit 102 comprises printed safety capacitors 110 and 112 that are connected in series with the line wire 106 and the neutral wire 108, respectively. In some embodiments, the safety capacitors 110 and 112 can be devices with specific construction, especially with regard to insulation, that provide isolation compliant with Underwriters Laboratories (UL) and International Electrotechnical Commission (IEC) safety requirements between high-voltages supplied by the PLC network and low-voltage circuits that users can contact. The safety capacitors 110 and 112 may be constructed so that the high-voltage PLC network and the low-voltage circuits are isolated even when high voltage transients are encountered on the PLC network. As depicted in FIG. 1, the coupling unit 102 may also comprise resistors 114 and 116 in series with the printed safety capacitors 110 and 112, respectively. The resistors 114 and 116 can provide an additional voltage drop to further reduce the amplitude of an incoming AC powerline signal. The resistors 114 and 116 can also serve to limit surge currents that can occur if fast voltage transients pass through (i.e., are not blocked by) the safety capacitors 110 and 112. The coupling unit 102 further comprises shunt capacitors 118 and 120 that form a voltage divider at the output of the coupling unit 102. As shown in FIG. 1, the shunt capacitors 118 and 120 are connected to ground to provide filtering of high frequency noise. In some embodiments, in addition to the shunt capacitors 118 and 120, the coupling unit 102 may also comprise a resistor with high resistance (not shown) connected in parallel across both of the shunt capacitors 118 and 120.

The output of the coupling unit 102 is provided to the zero cross detector 104. The zero cross detector 104 comprises an amplifier unit 122, an ADC unit 124, and a digital processing unit 126. In one embodiment, the amplifier unit 122 can be a programmable gain amplifier (PGA). The output of the digital processing unit 126 is fed back to the amplifier unit 122 for automatic gain control (AGC). In one example, the ADC unit 124 comprises a multi-bit analog-to-digital converter (e.g., 9-bit ADC). The ADC unit 124 can convert an analog representation of an AC powerline signal sample into its corresponding digital representation. Converting the AC powerline signal sample into a multi-bit digital representation can enable digital post-processing to remove noise/interference from the desired powerline signal and extract zero cross information (e.g., zero cross time instants) from the powerline signal.

In some embodiments, the printed safety capacitors 110 and 112 can be implemented on internal core layers of a multi-layer PCB. For example, the printed safety capacitors 110 and 112 can be fabricated on the second and third layers of a four-layer PCB. Fabricating the printed safety capacitors 110 and 112 on the internal layers can provide safety isolation because of the surrounding dielectric material, and can minimize the possibility of high resistance leakage paths for current caused by PCB surface contamination. More specifically, the process of soldering components on the PCB can leave residue on the outer (or surface) layers of the PCB. Typically, "no-clean" fabrication processes are employed, where the residue is not completely removed from the surface of the PCB using solvents/detergent/water to minimize environmental impact. The remaining residue on the surface of the PCB typically has very high impedance. However, in accordance with techniques described herein, the size of the printed safety capacitors 110 and 112 and power consumption may be reduced by utilizing the high input impedance. However, the high impedance can cause a large DC offset. This DC offset can overwhelm the input stage (e.g., the amplifier unit 122) and can affect the desired voltage level of the powerline signal provided to the ADC unit 124. For example, the DC offset may affect the desired voltage level if both the DC offset and the desired voltage level are of the order of mV. The outer/surface layers of the PCB may also accumulate airborne contaminants (e.g., dust) that may absorb moisture from the air and become slightly conductive. These contamination issues typically do not occur on internal layers of the PCB and therefore, may be used for fabricating the printed safety capacitors 110 and 112.

In some embodiments, each of the printed safety capacitors may be fabricated on a different layer of the PCB. For example, the safety capacitor 110 connected to the line wire 106 may be fabricated on the second layer; while the safety capacitor 112 connected to the neutral wire 108 may be fabricated on the third layer of a four-layer PCB. However, in other embodiments, both the safety capacitors 110 and 112 may be fabricated on the same layer of the PCB. In other embodiments, the printed safety capacitors 110 and 112 can be implemented on any suitable layer of a multi-layer PCB (e.g., internal or external layers). In some embodiments, the printed safety capacitors 110 and 112 can have a very low capacitance relative to the frequency of operation of the PLC circuit 100. For example, the printed safety capacitors 110 and 112 may have a capacitance that is of the order of a few picoFarads; while the PLC circuit 100 may operate at a frequency of 50 Hz/60 Hz. Accordingly, the printed safety capacitors 110 and 112 can provide a high reactance, thereby significantly reducing the amplitude of the input AC powerline signal. For example, the printed safety capacitors 110 and 112 may reduce a 120 V/240 V AC powerline signal to a few mV. In some embodiments, the printed safety capacitors 110 and 112 can be implemented external to an integrated circuit (IC) that implements the zero cross detector 104. For example, the printed safety capacitors 110 and 112 can be implemented on a PCB that is external to the integrated circuit that implements the zero cross detector 104.

Although FIG. 1 depicts the PLC circuit 100 being coupled to the line wire 106 and the neutral wire 108 of the PLC network, embodiments are not so limited. In other embodiments, the PLC circuit 100 may be coupled to other suitable wire pairs of the PLC network. For example, the PLC circuit 100 may be coupled to the line wire 106 and the ground wire (not shown) or protective Earth wire (not shown) of the PLC circuit 100.

Figure 2:
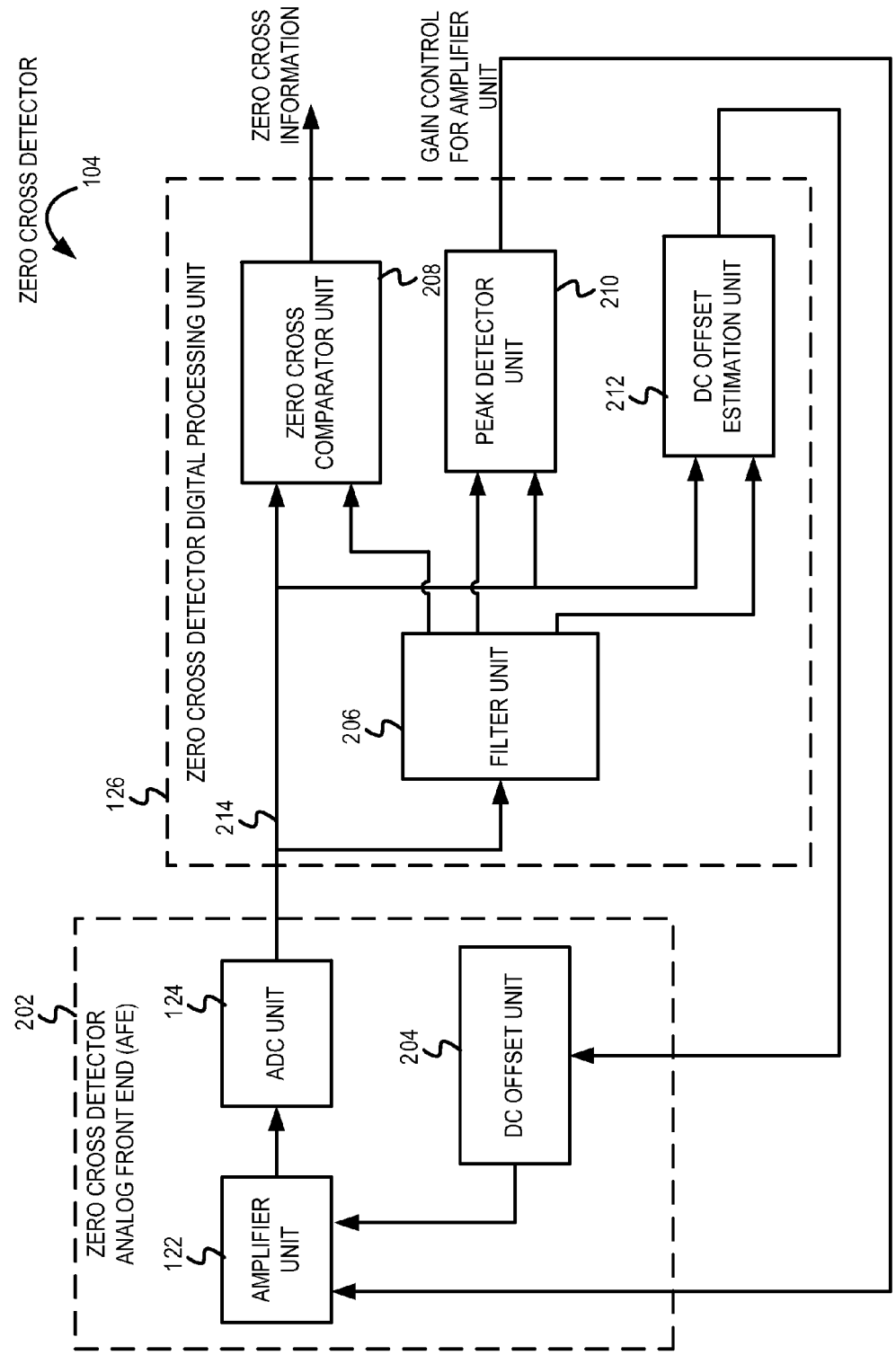
FIG. 2 is a block diagram illustrating one embodiment of the zero cross detector.

FIG. 2 is a block diagram illustrating one embodiment of the zero cross detector 104. FIG. 2 depicts a zero cross detector analog front end (AFE) 202 and a zero cross detector digital processing unit 126. The AFE 202 comprises the amplifier unit 122, the ADC unit 124, and a DC offset unit 204. The digital processing unit 126 comprises a filter unit 206, a zero cross comparator unit 208, a peak detector unit 210, and a DC offset estimation unit 212. The output of the DC offset estimation unit 212 is provided to the DC offset unit 204 which, in turn, applies the estimated DC offset to the amplifier unit 122. After amplification and analog-to-digital conversion, a digital powerline signal sample 214 is provided to the filter unit 206 and the zero cross comparator unit 208. In some embodiments, the filter unit 206 comprises a multi-stage infinite impulse response (IIR) band pass filter tuned to all the powerline cycle frequencies (e.g., both 50 Hz and 60 Hz). In some embodiments, the filter unit 206 may be formed by a cascade of bi-quad filter stages. In some embodiments, the filter unit 206 may use multipliers to apply suitable filter coefficients to the digital powerline signal sample 214. In other embodiments, the filter unit 206 may use one or more adder stages to apply suitable filter coefficients to the digital powerline signal sample 214 and to reduce hardware complexity of the multipliers. The output of the filter unit 206 is provided to the zero cross comparator unit 208, the peak detector unit 210, and the DC offset estimation unit 212. Additionally, the output of the ADC unit 124 may also be provided to the zero cross comparator unit 208, the peak detector unit 210, and the DC offset estimation unit 212.

The input to the zero cross comparator unit 208 can be selected as the output of the ADC unit 124 or the output of the filter unit 206. In some embodiments, the output of the ADC unit 124 may be directly provided to the zero cross comparator unit 208, without applying the filter unit 206. Although not depicted in FIG. 2, in some embodiments, the zero cross detector 104 can comprise a multiplexer (or other selection functionality) at the input to the zero cross comparator unit 208 to provide the output of the ADC unit 124 or the output of the filter unit 206 to the zero cross comparator unit 208. However, in other embodiments, the selection functionality can be implemented as part of the zero cross comparator unit 208. In some embodiments, whether the output of the ADC unit 124 or the output of the filter unit 206 is provided to the zero cross comparator unit 208 may depend on the type of application and/or the type of isolation coupling used. The zero cross comparator unit 208 can compare the input signal (e.g., the output of the ADC unit 124 or the output of the filter unit 206) against predetermined hysteresis thresholds to determine zero cross time instants ("zero cross information"). The hysteresis thresholds may be selected based on the amplifier gain level and the properties of the signal after isolation coupling. In other embodiments, the zero cross comparator unit 208 can use a weighted combination of the output of the ADC unit 124 and the output of the filter unit 206 to determine the zero cross information.

The output of the zero cross comparator unit 208 is a logic level signal that represents the zero crossings of the AC powerline signal and that indicates a static offset to the AC zero cross positions. Thus, the zero cross comparator unit 208 can help recover frequency and phase information of the AC powerline signal. In some embodiments, the zero cross positions can be used in HomePlug® compatible PLC devices to establish the location of a beacon message and tone-map region boundaries. The beacon message broadcast by a central coordinator can establish a time basis for other network devices that associate with the central coordinator. The zero cross positions may be used to meet powerline noise synchronization requirements of the channel adaptation and tone map generation procedures, for synchronization of the beacon transmissions with the AC line cycle, and for synchronization of signaling which is required by the inter-system protocol (ISP) which is described in the IEEE 1901 standard.

The input to the peak detector unit 210 can be selected as the output of the ADC unit 124 or the output of the filter unit 206. Although not depicted in FIG. 2, in some embodiments, the zero cross detector 104 can comprise a multiplexer (or other selection functionality) at the input to the peak detector 210 to provide the output of the ADC unit 124 or the output of the filter unit 206 to the peak detector 210. In other embodiments, the selection functionality can be implemented as part of the peak detector 210. In some embodiments, whether the output of the ADC unit 124 or the output of the filter unit 206 is provided to the peak detector 210 may depend on the type of application and/or the type of isolation coupling used. The peak detector unit 210 can compare the output of the ADC unit 124 or the output of the filter unit 206 against a peak detector threshold level. The peak detector threshold level can be determined based, at least in part, on the absolute value of the input signal (i.e., the output of the ADC unit 124 or the output of the filter unit 206). The peak detector unit 210 can determine a peak-to-peak voltage of the input signal and can select an appropriate gain level (or amplification factor) for the amplifier unit 122. This can ensure that the output of the amplifier unit 122 is within a full-scale operating range of the ADC unit 124. The peak detector 210 can periodically evaluate the peak-to-peak voltage of the input signal to ensure that the amplifier unit 122 applies the appropriate gain level. In some embodiments, the peak detector unit 210 can use a weighted combination of the output of the ADC unit 124 and the output of the filter unit 206 to determine the gain level for the amplifier unit 122.

The input to the DC offset estimation unit 212 can be selected as the output of the ADC unit 124 or the output of the filter unit 206. Although not depicted in FIG. 2, in some embodiments, the zero cross detector 104 can comprise a multiplexer (or other selection functionality) at the input to the DC offset estimation unit 212 to provide the output of the ADC unit 124 or the output of the filter unit 206 to the DC offset estimation unit 212. In other embodiments, the selection functionality can be implemented as part of the DC offset estimation unit 212. In some embodiments, whether the output of the ADC unit 124 or the output of the filter unit 206 is provided to the DC offset estimation unit 212 may depend on the type of application and/or the type of isolation coupling used. However, in other embodiments, the DC offset estimation unit 212 can use a weighted combination of the output of the ADC unit 124 and the output of the filter unit 206 to determine the gain level for the amplifier unit 122. In some embodiments, the amplifier unit 122 may have a DC offset because of the biasing of various components of the amplifier unit 122. In some embodiments, the DC offset may be determined based on an ADC range and an amplifier gain. In other words, the DC offset may be selected so that the amplifier unit 122 is biased at a midpoint (or approximately the midpoint) of the full-scale operating range of the ADC unit 124. After estimating the DC offset, the DC offset estimation unit 212 can provide a digital representation of the DC offset ("digital DC offset") to the DC offset unit 204. The DC offset unit 204 can convert the digital DC offset at the output of the DC offset estimation unit 212 into a corresponding analog DC offset. The DC offset unit 204 can then apply the analog DC offset to the amplifier unit 122. In some embodiments, the amplifier unit 122 may be set to a lowest gain level to estimate the DC offset. After estimating and applying the DC offset, the gain of the amplifier unit 122 can be adjusted based on the output of the peak detector unit 210.

Figure 3:
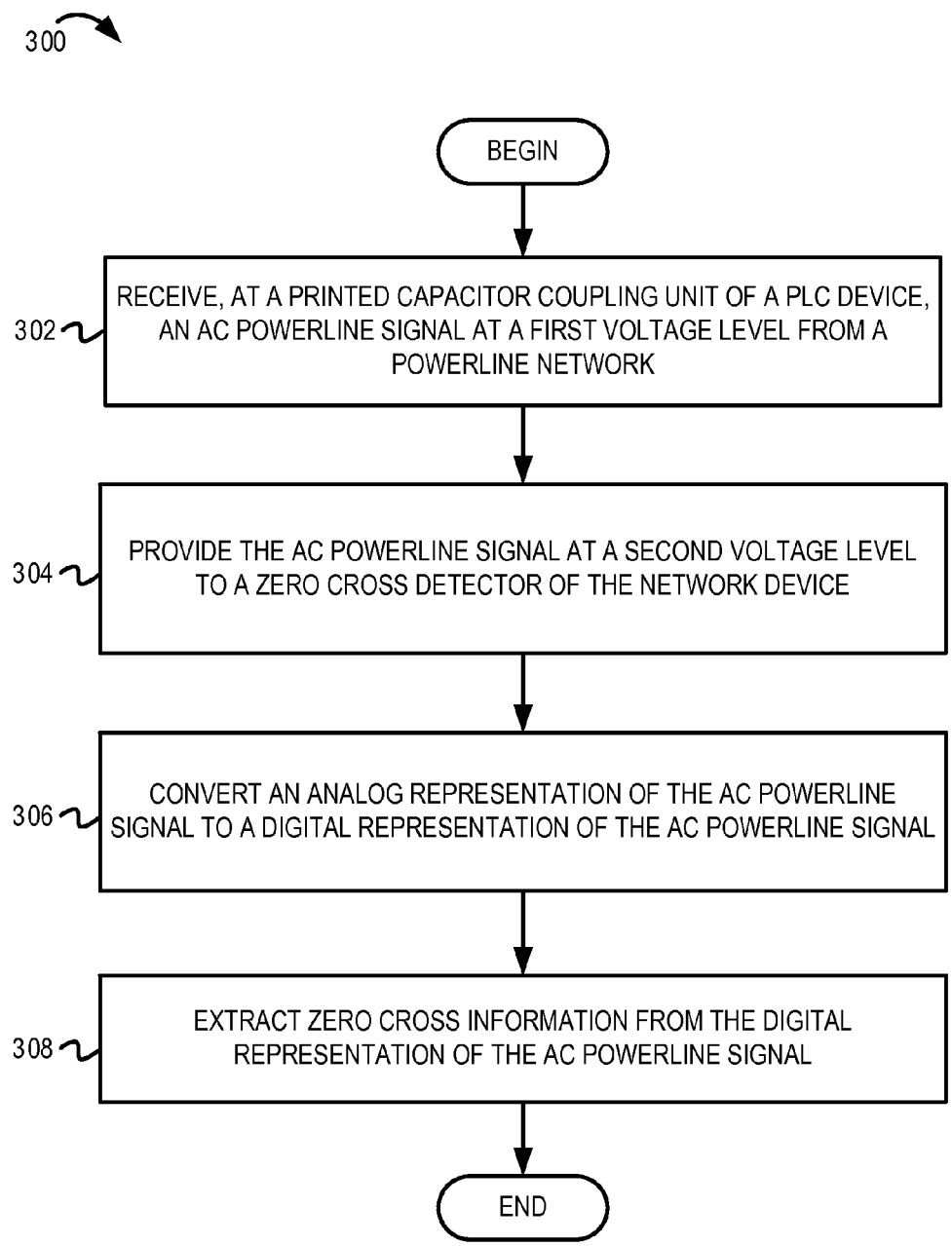
FIG. 3 is a flow diagram illustrating example operations of a PLC device comprising printed capacitors and a zero cross detector.

FIG. 3 is a flow diagram flow diagram ("flow") 300 illustrating example operations of a PLC device comprising printed safety capacitors and an ADC-based zero cross detector. The flow 300 begins at block 302.

At block 302, a printed capacitor coupling unit of a PLC device receives an AC powerline signal at a first voltage level from a PLC network. With reference to the example of FIG. 1, the coupling unit 102 can receive the AC powerline signal from the line wire 106 and the neutral wire 108 of the PLC network. The AC powerline signal may then be provided to the printed safety capacitors 110 and 112 of the coupling unit 102. The flow continues at block 304.

At block 304, the AC powerline signal is provided at a second voltage level to a zero cross detector of the network device. For example, the printed safety capacitors 110 and 112 of the coupling unit 102 can reduce the amplitude of the AC powerline signal to a second voltage level that is lower than the first voltage level. For example, the first voltage level may be 12V peak-to-peak, while the second voltage level may be 50 mV peak-to-peak. The AC powerline signal at the reduced voltage level is then provided from the coupling unit 102 to the zero cross detector 104. The flow continues at block 306.

At block 306, an analog representation of the AC powerline signal is converted to a digital representation of the AC powerline signal. With reference to the example of FIG. 1, the ADC unit 124 can use any suitable analog-to-digital conversion techniques to convert an analog powerline signal into a corresponding digital powerline signal. In some embodiments, the amplifier unit 122 may amplify the analog AC powerline signal received from the coupling unit 102 to ensure appropriate illumination of the ADC unit 124. In other embodiments, the amplifier unit 122 may attenuate the analog AC powerline signal received from the coupling unit 102. After amplification (or attenuation), the resultant analog AC powerline signal may be provided to the ADC unit 124. The flow continues at block 308.

At block 308, zero cross information is extracted from the digital representation of the AC powerline signal. As described above with reference to FIGS. 1 and 2, the filter unit 206 can filter the digital representation of the AC powerline signal to yield a zero cross signal that is at the powerline cycle frequency. In some embodiments, the output of the filter unit 206 can be compared against hysteresis thresholds to minimize fluctuations in the zero cross information and to improve the accuracy of the zero cross information. From block 308, the flow ends.

Although FIGS. 1-3 describe the coupling unit 102 including two printed safety capacitors 110 and 112, two series resistors 114 and 116, and two shunt capacitors 118 and 120, embodiments are not so limited. In other embodiments, the coupling unit 102 may include only one set of components connected to the line wire 106. For example, the coupling unit 102 may only include the printed safety capacitor 110, the series resistor 114, and the shunt capacitor 118. However, it is noted that the two sets of components (one set for the line wire 106 and the other set for the neutral wire 108) may be used for safety reasons. When a plug of the PLC circuit 100 is correctly inserted into a powerline socket, the line terminal of the PLC circuit 100 connects to the line wire 106 of the powerline network and the neutral terminal of the PLC circuit 100 connects to the neutral wire 108 of the powerline network. However, if the polarity is reversed or the powerline socket is wired incorrectly, the line terminal of the PLC circuit 100 may connect to the neutral wire 108 of the powerline network and the neutral terminal of the PLC circuit 100 may connect to the line wire 106 of the powerline network. This can result in safety issues. The two sets of components (one set for the line wire 106 and the other set for the neutral wire 108) may be used to make the PLC circuit 100 independent of polarization at the powerline socket.

In some embodiments, the ADC-based zero cross detector may be used in embedded PLC applications where the AC powerline signal (used for the zero cross detection) is carried over the same wire pair that provides current to the PLC-capable device from an external power supply, as will be further described with reference to FIGS. 4-9.

Figure 4:
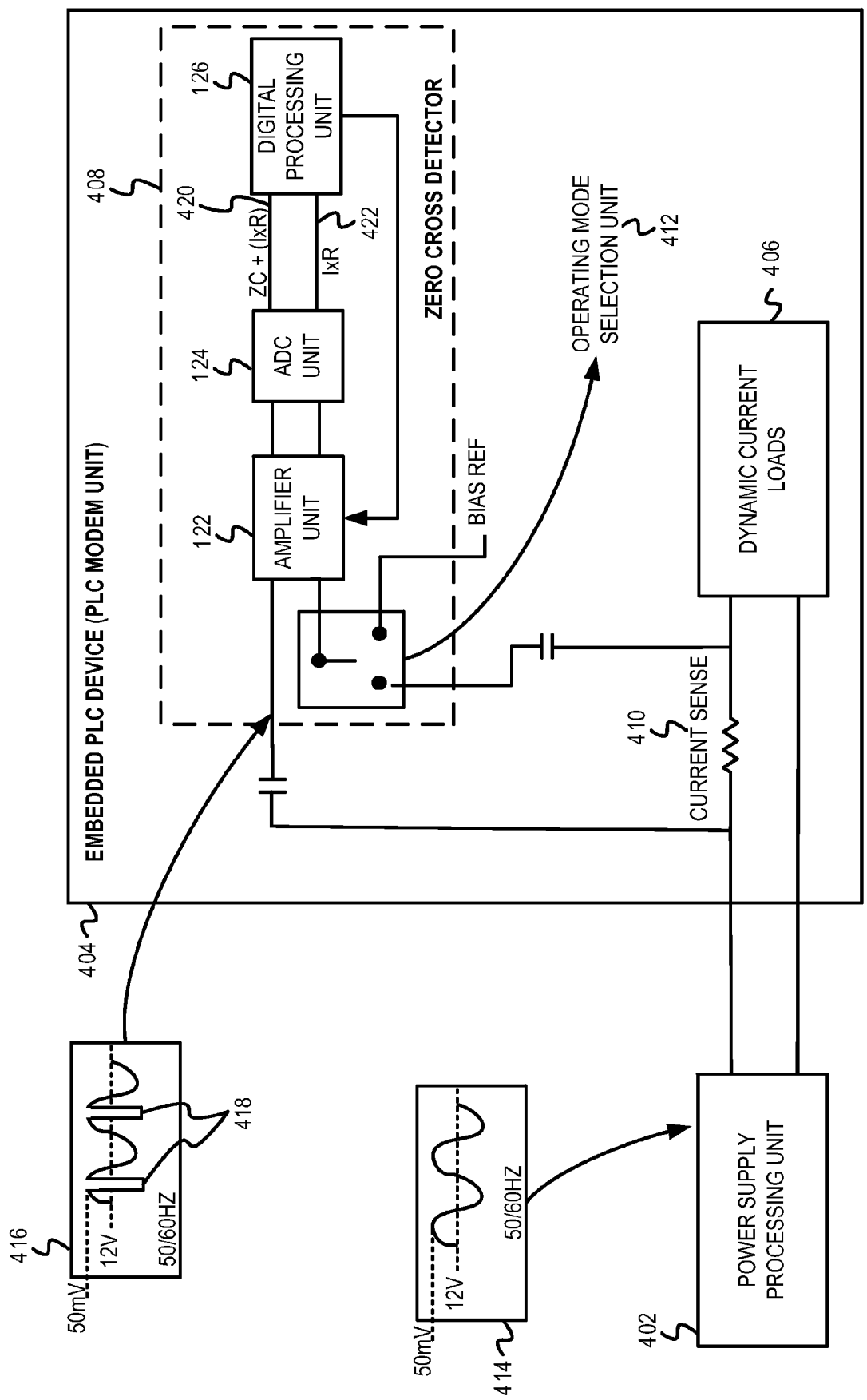
FIG. 4 is an example circuit diagram including mechanisms for zero cross detection in an embedded PLC application.

FIG. 4 is an example circuit diagram including mechanism for zero cross detection in an embedded PLC application. In FIG. 4, functionality of a PLC adapter module can be offloaded into two distinct units—a power supply processing unit 402 and an embedded PLC device 404 (e.g., a PLC modem unit). The embedded PLC device 404 may be integrated with other communication devices (e.g., a WLAN chipset) within an electronic system. For example, the embedded PLC device 404 may be mounted on one of the circuit boards within the electronic system. The power supply processing unit 402 can comprise the power supply and safety coupling networks, and can be implemented external to the electronic system. For example, the power supply processing unit 402 may be implemented in a power supply adapter or in a wall module that connects to a power outlet. In some embodiments, the embedded PLC device 404 can be implemented within a PLC-enabled electronic device (also referred to as the PLC device), such as a laptop, a PLC-capable television, a television set-top box, a multimedia center, a gaming console, and other suitable PLC-capable electronic devices. For example, the embedded PLC device 404 may be implemented within an integrated circuit that is mounted on a circuit board of the electronic device.

In another example, the embedded PLC device 404 can be integrated with other communication devices (e.g., a WLAN device) within an integrated circuit (e.g., a system-on-a-chip or SoC) that is mounted on a circuit board of the electronic device. In some embodiments, the embedded PLC device 404 may be integrated within the PLC device (e.g., on the motherboard of the laptop).

In some embodiments, the power supply processing unit 402 can receive an input AC powerline signal. The power supply processing unit 402 can generate a DC power signal and a ground signal supplied to the embedded PLC device 404, and a zero cross signal that enables proper processing of a PLC signal by the embedded PLC device 404. The power supply processing unit 402 can modulate the zero cross signal onto the DC power signal. In some embodiments, the power supply processing unit 402 can also extract the PLC signal from the input AC powerline signal. The power supply processing unit 402 can combine the PLC signal with the DC power signal (that comprises the modulated zero cross signal) to yield a composite PLC signal. The composite PLC signal can then be provided to the embedded PLC device 404 (e.g., via the two-wire cable or a multi-wire cable) for further processing. Graph 414 represents the signal waveform transmitted from the power supply processing unit 402 to the embedded PLC device 404. The graph 414 depicts a 12V nominal DC voltage that includes a superimposed AC zero cross signal. In the example of FIG. 4, the AC zero cross signal has a 50 mV peak amplitude.

Figure 5:
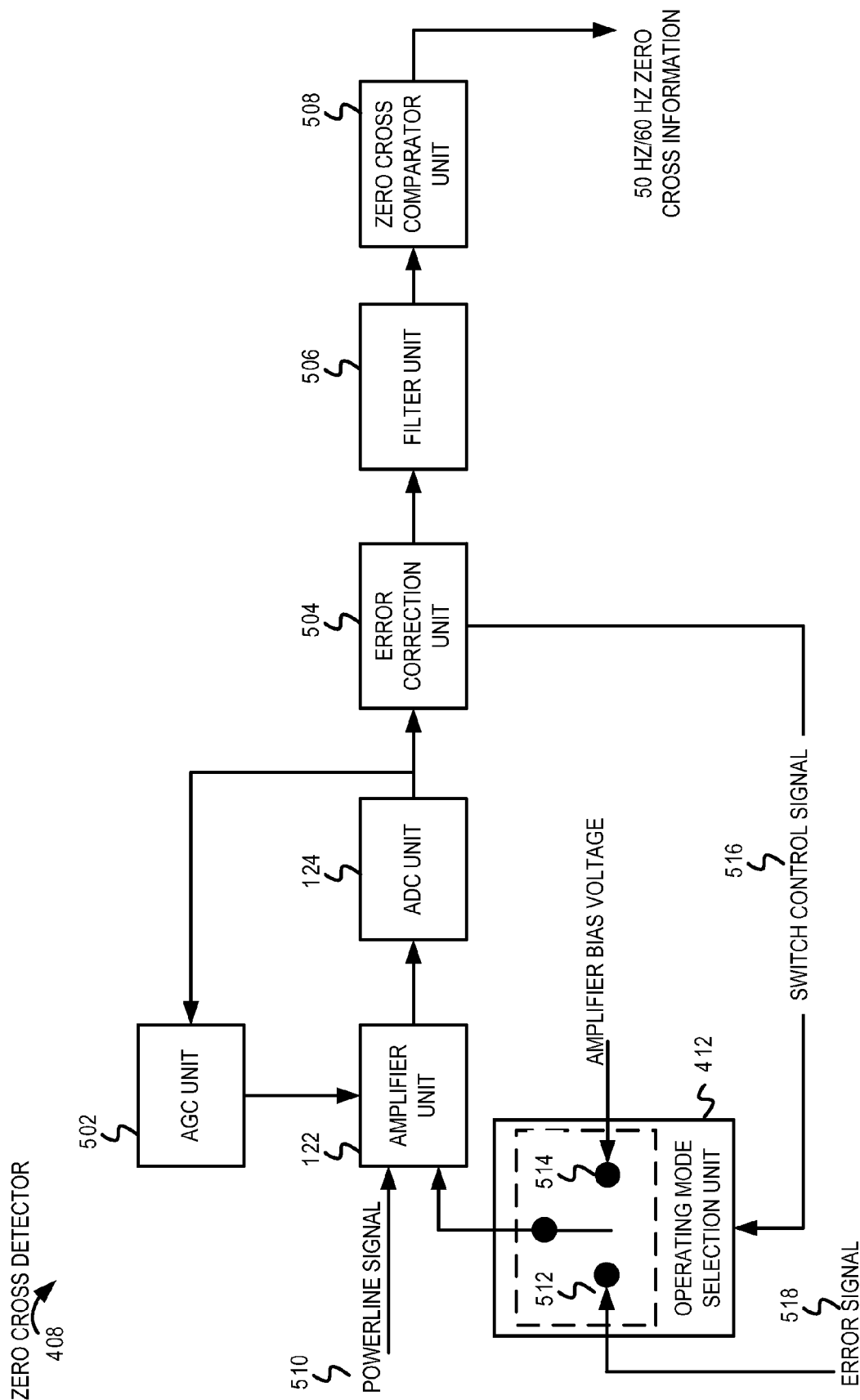
FIG. 5 is a block diagram of one embodiment of the zero cross detector in an embedded PLC application.

The embedded PLC device 404 includes a zero cross detector 408 (further described in FIG. 5). The zero cross detector 408 can receive the DC signal with the superimposed AC zero cross signal. The zero cross detector 408 can use the AC zero cross signal to generate timing and synchronization information for proper processing of the PLC signal. Additionally, the embedded PLC device 404 can comprise other processing components (e.g., dynamic current loads 406) that can draw current/power received from the power supply processing unit 402. For example, the dynamic current loads 406 may comprise constant loads that are consistently switched ON and that draw a constant amount of power. The dynamic current loads 406 may also comprise dynamic loads that can be switched ON/OFF and that draw varying amounts of power depending on whether they are switched ON/OFF. The dynamic current loads 406 may include a combination of the dynamic current load presented by the embedded PLC device 404 and the dynamic current load presented by a host device. Specifically, the dynamic current loads 406 can represent the summation of all the currents flowing to power the entire PLC device (i.e., the power supply processing unit 402 and the embedded PLC device 404).

In some instances, the dynamic loads can be switched ON/OFF at a rate that is approximately equal to the powerline frequency. For example, wireless routers, PLC-capable routers, and other suitable dynamic loads may be enabled/disabled at approximately 50 Hz or 60 Hz. This can result in unwanted voltage drops that may be of approximately the same peak-to-peak amplitude and frequency as the desired zero cross signal. Accordingly, the dynamic voltage drops can make it very difficult to recover the zero cross information used for decoding the PLC signal. Graph 416 represents the signal waveform including the dynamic voltage drops at the input of the zero cross detector 408. The graph 416 depicts the 12V nominal DC voltage that includes a superimposed AC zero cross signal. In the example of FIG. 4, the AC zero cross signal has a 50 mV peak amplitude. Furthermore, the AC zero cross signal also includes voltage drops 418 that may be of approximately the same peak-to-peak amplitude and frequency as the desired zero cross signal.

In some embodiments, as depicted in FIG. 4, the embedded PLC device 404 may comprise a current sense resistor 410. The current sense resistor 410 can be implemented at the input of the zero cross detector 408 and in series with the dynamic current loads 406. The current sense resistor 410 can be used to determine the variation in the current drawn because of switching ON/OFF one or more components of the embedded PLC device 404 (e.g., components of the dynamic current loads 406). Specifically, as the embedded PLC device 404 draws current, voltage drop 418 is generated across the current sense resistor 410. As the amount of current drawn increases, the voltage drop 418 generated across the current sense resistor 410 increases. As depicted in the embedded PLC device 404, an operating mode selection unit 412 is implemented at the input of the amplifier unit 122 to alternate between sampling the powerline signal and a differential signal (also referred to as "error signal" or "IR drop signal") across the current sense resistor 410. The error signal across the current sense resistor 410 can include the voltage drops that are generated because of dynamic loading. As will be further described in FIG. 5, the operating mode selection unit 412 can be toggled so that the powerline signal and the error signal are alternately sampled. The amplifier unit 122 and the ADC unit 124 can amplify and convert a signal sample (e.g., alternately a powerline signal sample and an error signal sample) generated at each sample instant. The ADC unit 124 provides the powerline signal sample 420 and the error signal sample 422 to the digital processing unit 126. The powerline signal sample 420 comprises a combination of the zero cross signal (ZC) and the dynamic voltage drops (IxR). The error signal sample 422 comprises the dynamic voltage drops (IxR). As will be further described below in FIG. 5, the digital processing unit 126 can combine the digital representations of the powerline signal samples and the error signal samples to cancel the dynamic loading errors and to extract the zero cross information.

FIG. 5 is a block diagram of one embodiment of the zero cross detector 408 in an embedded PLC application. The zero cross detector 408 comprises the operating mode selection unit 412, the amplifier unit 122, the ADC unit 124, an AGC unit 502, an error correction unit 504, a filter unit 506, and a zero cross comparator unit 508. The amplifier unit 122 is coupled with the ADC unit 124. The output of the ADC unit 124 is provided to the AGC unit 502 and the error correction unit 504. The error correction unit 504 is coupled with the filter unit 506 and the operating mode selection unit 412. The filter unit 506 is coupled with the zero cross comparator unit 508; and the operating mode selection unit 412 is coupled with the amplifier unit 122.

The AGC unit 502 can ensure that the ADC unit 124 is appropriately illuminated. The AGC unit 502 can dynamically select an appropriate gain level of the amplifier unit 122 to adapt to large-scale variations in the PLC network, design variations from one PLC device to another, etc. The large scale variations are typically longer than the time period of the powerline cycle frequency (e.g., longer than (1/50)s or (1/60)s). The AGC unit 502 can dynamically adjust the gain applied by the amplifier unit 122 to ensure that the input powerline signal 510 is not over-amplified because this can overdrive the subsequent digital processing blocks, such as the ADC unit 124. Overdriving the digital processing blocks can result in digital distortion and signal clipping. The AGC unit 502 can dynamically adjust the gain applied by the amplifier unit 122 to ensure that the input powerline signal 510 is not under-amplified, thus minimizing the interference between the powerline signal 510 and the noise signal. Although FIG. 5 depicts the AGC unit 502 selecting the gain of the amplifier unit 122, embodiments are not so limited. In other embodiments, the gain of the amplifier unit 122 can be predetermined or controlled in firmware.

The error correction unit 504 provides a switch control signal 516 to the operating mode selection unit 412. The error correction unit 504 can control a switch (e.g., implemented in the operating mode selection unit 412) that determines whether to sample the powerline signal 510 or the error signal 518. In other embodiments, the switch may be implemented within the amplifier unit 122 or in another suitable processing device prior to analog-to-digital conversion. In some embodiments, the switch can be implemented on a PCB that comprises the zero cross detector 408. In other embodiments, however, the switch can be implemented on another circuit board external to the circuit board that comprises the zero cross detector 408. The operating mode selection unit 412 comprises an amplifier bias voltage terminal 514 and an error signal terminal 512. In FIG. 5, one input to the amplifier unit 122 is the powerline signal 510. The other input to the amplifier unit 122 is the output of the operating mode selection unit 412, and can be toggled to generate either a powerline signal sample or an error signal sample. As discussed above, the sample of powerline signal 510 comprises the AC zero cross signal and the dynamic voltage drops. The error signal sample is a sample of the voltage across the current sense resistor 410 and therefore, may also be referred to as a "current sense sample." When the switch is connected to the amplifier bias voltage terminal 514, a biasing voltage is applied to the amplifier unit 122 and the powerline signal 510 is provided to the zero cross detector 408. Specifically, the amplifier unit 122 receives a sample of the powerline signal 510. The powerline signal 510 $v_{in}(t)$ can be expressed as a combination of an input AC zero cross signal $v_{ac}(t)$ and a voltage drop across an unknown wire resistance $R_w$, wherein i(t) is the time varying current being delivered by a power source, as depicted in Eq. 1.

$$v_{in}(t)=v_{ac}(t)-i(t)R_w \qquad \text{Eq. 1}$$

When the switch is connected to the error signal terminal 512, the voltage drop $v_s$(t) across the current sense resistance $R_s$ is provided as an input to the zero cross detector 408. As described above with reference to FIG. 4, the error signal 518 is generated across the current sense resistor 410. The error signal 518 may include the dynamic voltage drops that should be cancelled from the powerline signal 510. The amplifier unit 122 receives a sample of the error signal 518 comprising only the dynamic voltage drops. The error signal $v_s(t)$ 518 across the current sense resistor 410 is represented by Eq. 2, where $R_s$ is the resistance of the current sense resistor 410.

$$v_s(t)=i(t)R_s \qquad \text{Eq. 2}$$

In accordance with the switch control signal 516, the operating mode selection unit 412 can ensure that the powerline signal 510 and the error signal 518 are alternately sampled. In some embodiments, the operating mode selection unit 412 can switch between the powerline signal 510 and the error signal 518 every sampling instant. For example, the first sample can be a powerline signal sample, the second sample can be an error signal sample, and so on. In another embodiment, the operating mode selection unit 412 can switch between the powerline signal 510 and the error signal 518 every predetermined number of sampling instants. For example, the first and second samples can be powerline signal samples, the third and fourth samples can be error signal samples, and so on.

The amplifier unit 122 can amplify the samples of the powerline signal 510 and the samples of the error signal 518 in accordance with a gain level selected by the AGC unit 502. The ADC unit 124 can convert an analog representation of the powerline signal sample or the error signal sample into a corresponding digital representation. In some embodiments, a single ADC unit 124 and a single amplifier unit 122 may be used for amplifying and converting the error signal samples and the powerline signal samples. In this embodiment, the AGC unit 502 may control the gain level of the amplifier unit 122 to optimize the voltage range for both the powerline signal samples and the error signal samples. This is because it may be difficult to switch between a powerline signal gain level and an error signal gain level if the input to the amplifier unit 122 is switched at approximately the same rate as the ADC sample frequency.

In some embodiments, the zero cross detector 408 may not comprise the operating mode selection unit 412 if the zero cross detector 408 comprises two amplifier units and two ADC units—one set for processing the powerline signal sample and the other set for processing the error signal sample. In this embodiment, the gain level for each of the amplifier units may be independently optimized for the error signal samples and the powerline signal samples respectively. This can ensure that each corresponding ADC unit can generate samples for the digital processing unit 126 at the maximum sampling rate.

The error correction unit 504 can combine the stream of powerline signal samples and error signal samples (or current sense samples) to yield a corrected powerline signal. Specifically, the error correction unit 504 can subtract an appropriately scaled version of the error signal sample (or current sense sample) from the powerline signal sample to remove the noise and voltage drops and to yield the corrected powerline signal sample. In some embodiments, the error correction unit 504 may be enabled or disabled depending on the application of the PLC device that comprises the zero cross detector 408. For example, an "enable" signal may be applied to the error correction unit 504 when the zero cross detector 408 is implemented in an embedded PLC device, such as a PLC-capable home appliance. As another example, a "disable" signal may be applied to the error correction unit 504 when the zero cross detector 408 is implemented in a standalone or dedicated PLC device that is directly connected to an AC power outlet. The "disable" signal may also be applied if it is determined that error correction is not required in the embedded PLC device 404. Operations of the error correction unit 504 will further be described with reference to FIG. 6.

The corrected powerline signal is provided to the filter unit 506. In some embodiments, the filter unit 506 comprises a multi-stage IIR band pass filter tuned to all the powerline cycle frequencies (e.g., both 50 Hz and 60 Hz). The filter unit 506 can isolate the 50 Hz or 60 Hz AC powerline signal from the noise signal and provide a clean signal to estimate the zero cross information. In some embodiments, the filter unit 506 may be formed by a cascade of bi-quad filter stages. In some embodiments, the filter unit 506 may use multipliers to apply suitable filter coefficients to the corrected powerline signal. However, in other embodiments, the filter unit 506 may use one or more adder stages to apply suitable filter coefficients to the corrected powerline signal to reduce hardware complexity of the multipliers. The output of the filter unit 506 is provided to the zero cross comparator unit 508. The zero cross comparator unit 508 can comprise a comparator with hysteresis thresholds to determine zero cross time instants. In some embodiments, the hysteresis thresholds can be predetermined or dynamically configured based on the noise level of other processing components in the zero cross detector (e.g., the filter unit 506, the ADC unit 124, etc.). In some embodiments, the output of the ADC unit 124 may be directly provided to the zero cross comparator unit 508 without applying the filter unit 506. In some embodiments, whether the output of the ADC unit 124 or the output of the filter unit 506 is provided to the zero cross comparator unit 508 may depend on the type of application and/or the type of isolation coupling employed. In some embodiments, the hysteresis thresholds may be selected based on the amplifier gain level and the properties of the signal after isolation coupling. The output of the zero cross comparator unit 508 is a logic level signal that represents the zero crossings of the powerline waveform and that indicates a static offset to the AC zero cross positions. Thus, the zero cross detector 408 can help recover frequency and phase information from the powerline signal 510. In some embodiments, the zero cross positions can be used in HomePlug® compatible PLC devices to establish the location of a beacon message and tone-map region boundaries. The beacon message broadcast by a central coordinator can establish a time basis for other network devices that associate with the central coordinator. The zero cross positions may be used to meet powerline noise synchronization requirements of the channel adaptation and tone map generation procedures, for synchronization of the beacon transmissions with the AC line cycle, and for synchronization of signaling which is required by the ISP.

Figure 6:
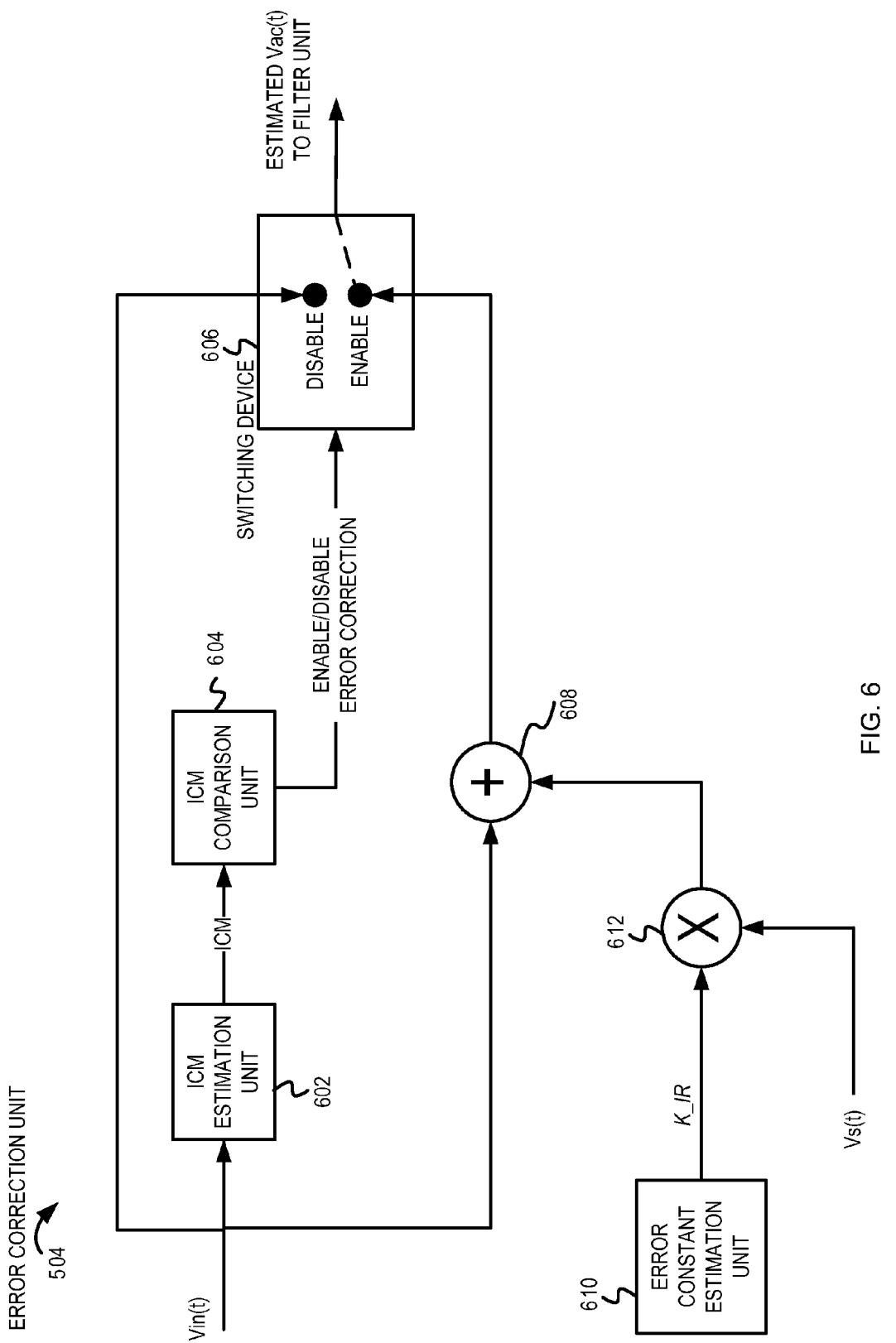
FIG. 6 is a block diagram illustrating one embodiment of an error correction unit.

FIG. 6 is a block diagram illustrating one embodiment of an error correction unit 504. With reference to Eq. 1 and Eq. 2 described above, the error correction unit 504 of FIG. 5 estimates the AC zero cross signal component ($v_{ac}(t)$ in Eq. 1) while removing the time varying voltage drop component (also referred to as "IR voltage drop," or "dynamic loading" or "dynamic voltage drop"). The IR voltage drop ($i(t)R_w$ in Eq. 1) is directly proportional to the voltage across the current sense resistor ($v_s(t)$ in Eq. 2). Therefore, in one embodiment, a scaled value of $v_s(t)$ can be estimated and added to the measured input voltage $v_{in}(t)$, as will be further described in FIG. 5. With reference to the example of FIG. 5, a sample of the input powerline signal $v_{in}(t)$ is generated when the operating mode selection unit 412 is set to the amplifier bias voltage terminal 514. A sample of the voltage $v_s(t)$ across the current sense resistor 410 is generated when the operating mode selection unit 412 is set to the error signal terminal 512. FIG. 6 depicts an input quality metric (ICM) estimation unit 602, an ICM comparison unit 604, a switching device 606, an adder 608, an error constant estimation unit 610, and a multiplier 612. The input powerline signal $v_{in}(t)$ is provided as an input to the ICM estimation unit 602. The ICM is used to determine if the input powerline signal has been corrupted by the dynamic voltage drops. The ICM can be estimated by determining a power of a filtered signal (e.g., at the output of the filter unit 506) and normalizing the filtered signal power by the total power of the input powerline signal $v_{in}(t)$ and the coefficient of variance of the input powerline signal. The ICM can be estimated in accordance with Eq. 3. In Eq. 3, filteredSignalPower represents a power of the filtered signal at the output of the filter unit 506, or a similar computation of the filtered signal power which may be performed by the error correction unit 504. In Eq. 3, totalSignalPower represents the total power of the input powerline signal $v_{in}(t)$. CV_Signal, representing the coefficient of variance of the signal power, is calculated in accordance with Eq. 4. In Eq. 4, std(InputSignalVoltage) represents a standard deviation of a predetermined number of input powerline signal samples and mean(abs(InputSignalVoltage)) is the mean (or average) of the absolute value of the predetermined number of input powerline signal samples.

$$ICM = \frac{filteredSignalPower}{(totalSignalPower)(CV\_Signal)} \quad \text{Eq. 3}$$

$$CV\_Signal = \frac{std(InputSignalVoltage)}{mean(abs(InputSignalVoltage))} \quad \text{Eq. 4}$$

The estimated ICM is provided as an input to the ICM comparison unit 604. The ICM comparison unit 604 can compare the ICM computed by the ICM estimation unit 602 against a threshold ICM ($ICM_{thresh}$). If the estimated ICM is greater than or equal to the threshold ICM, then it may be inferred that the input powerline signal 510 does not include dynamic loading. Consequently, subsequent operations for error correction (also referred to as "IR correction") may be disabled. If it is determined that the input powerline signal 510 does not include dynamic loading, the switching device 606 can be configured to the "disable" position and the input powerline signal $v_{in}(t)$ 510 can be directly provided to the filter unit 506 for subsequent processing, as described above in FIGS. 4 and 5. Otherwise, if the estimated ICM is less than the threshold ICM, then it may be inferred that the input powerline signal 510 includes dynamic loading. Specifically, if the filtered signal power is low and the total signal power is high, this can indicate that the signal quality is low, that the signal has a high noise/interference level, and that the input powerline signal 510 comprises dynamic loading. Consequently, the switching device 606 can be configured to the "enable" position and the error constant estimation unit 610 can estimate the error constant, as will be further described below.

With reference to Eq. 2, when the voltage $v_s(t)$ across the current sense resistor 410 is multiplied by the error constant (subsequently referred to as "IR constant" or K_IR), the resultant signal can be described in accordance with Eq. 5.

$$v_s(t)(K\_IR) = i(t)R_s(K\_IR) \quad \text{Eq. 5}$$

Adding Eq. 1 and Eq. 5 yields Eq. 6.

$$v_{in}(t) + v_s(t)(K\_IR) = v_{ac}(t) - i(t)R_w + i(t)R_s(K\_IR) \quad \text{Eq. 6}$$

For the right side of Eq. 6 to be equal to $v_{ac}(t)$, the condition described in Eq. 7 must be satisfied. Eq. 7 can further be solved to obtain an expression to determine the optimum value of the IR constant ($K_{IR_{opt}}$), depicted in Eq. 8.

$$-i(t)R_w + i(t)R_s(K\_IR) = 0 \quad \text{Eq. 7}$$

$$K_{IR_{opt}} = R_w/R_s \quad \text{Eq. 8}$$

In one embodiment, a block of digital powerline signal samples can be iteratively processed to estimate the optimum value of the IR constant. In this embodiment, the optimum value of the IR constant can be estimated using search optimization techniques. For example, conventional optimization techniques (e.g., golden section search optimization, parabolic interpolation, etc.) may be utilized to determine the value of the IR constant (K_IR) which optimize the accuracy of the zero cross detection. The conventional optimization techniques can iteratively determine the preferred value of the IR constant, which minimizes the error. For example, the preferred value of the IR constant can minimize the standard deviation of the error of the zero cross detection time with respect to a reference signal.

In this embodiment, the error constant estimation unit 610 can determine a range of values within which to search for the IR constant (K_IR). For example, the error constant estimation unit 610 can determine a starting value and an ending value within which to select the IR constant. The range of values may be predetermined based on simulations and/or historical analysis. The error constant estimation unit 610 can determine an estimate of the optimum IR constant K_IR(n) for the current iteration (e.g., $n^{th}$ iteration). The error constant estimation unit 610 can select the value of K_IR(n) that minimizes the standard deviation of an error vector e between the zero-cross time instants or indices determined from a set of input signal samples (e.g., digital powerline signal samples) and corresponding reference signal samples. Alternately, the error constant estimation unit 610 can select the value of K_IR(n) that minimizes the variance of the error vector. In some embodiments, the error vector e may be computed using the latest estimate of K_IR(n). The error constant estimation unit 610 may use the same set of input signal samples and reference signal samples to determine each estimate of the IR constant. The error constant estimation unit 610 may stop estimating the IR constant and may determine a final estimate of the IR constant if the maximum number of iterations have been completed, i.e., $n=n_{max}$, or if the absolute value of the error vector e is within a predetermined error threshold $e_{thresh}$, (i.e., $\|e\| \le e_{thresh}$).

In another embodiment, the error constant estimation unit 610 can estimate the IR constant (K_IR) in a time-varying manner to track gradual changes in the load resistance (e.g., the dynamic load). In this embodiment, the error constant estimation unit 610 may operate under the assumption that the change in the current with respect to time comprises signal components at frequencies other than the nominal AC powerline cycle frequency ($f_{ac}$). The value of $f_{ac}$ is typically 50 Hz or 60 Hz. In this embodiment, the input powerline signal $v_{in}(t)$ can be sampled at $f_{ac}$. Accordingly, as will be illustrated in Eq. 9a-Eq. 12, the ratio of the differences in consecutively sampled voltages for $v_{in}$ and $v_s(t)$ is equivalent to the optimal value of the IR constant (i.e., $R_w/R_s$ from Eq. 8). More specifically, samples of the powerline signal $v_{in}(t)$ are determined one period of the powerline cycle apart ($t_{offset}=1/f_{ac}$), as depicted in Eq. 9a and Eq. 9b. For example, for a 50 Hz powerline cycle frequency, if a first powerline signal sample is determined at t=0 ms, then a second powerline signal sample may be determined at t=20 ms. The difference between $v_{in}(t+1/f_{ac})$ and $v_{in}(t)$ can be represented by Eq. 10. In Eq. 10, the approximation is due to the periodicity of $v_{ac}(t)$.

$$v_{in}(t+1/f_{ac}) = v_{ac}(t+1/f_{ac}) - i(t+1/f_{ac})R_w \quad \text{Eq. 9a}$$

$$v_{in}(t) = v_{ac}(t) - i(t)R_w \quad \text{Eq. 9b}$$

$$v_{in}(t+1/f_{ac}) - v_{in}(t) = v_{ac}(t+1/f_{ac}) - i(t+1/f_{ac})R_w - \quad \text{Eq. 10}$$
$$(v_{ac}(t) - i(t)R_w)$$
$$\cong [i(t) - i(t+1/f_{ac})]R_w$$

Likewise, samples of the voltage across the current sense resistor $v_s(t)$ are determined one period of the powerline cycle apart, as depicted in Eq. 11a and 11b. For example, for a 50 Hz powerline cycle frequency, if a first $v_s(t)$ sample is determined at t=10 ms, then a second $v_s(t)$ sample may be determined at t=30 ms. Eq. 12 represents the change in the voltage across the current sense resistor $R_s$. Dividing Eq. 10 by Eq. 12 yields Eq. 13, which represents the IR constant.

$$v_s(t+1/f_{ac}) = i(t+1/f_{ac})R_s \quad \text{Eq. 11a}$$

$$v_s(t) = i(t)R_s \quad \text{Eq. 11b}$$

$$v_s(t+1/f_{ac}) - v_s(t) = i(t+1/f_{ac})R_s - i(t)R_s \quad \text{Eq. 12}$$
$$= [i(t+1/f_{ac}) - i(t)]R_s$$

$$\frac{v_{in}(t+1/f_{ac}) - v_{in}(t)}{v_s(t+1/f_{ac}) - v_s(t)} \cong [i(t) - i(t+1/f_{ac})]R_w / \quad \text{Eq. 13}$$
$$[i(t+1/f_{ac}) - i(t)]R_s$$
$$\cong -R_w/R_s$$

The quotient result of Eq. 13 can be multiplied by −1 to yield the optimal IR constant $R_w/R_s$ described above in Eq. 8. In some embodiments, the absolute value of the powerline signal difference (i.e., $v_{in}(t+1/f_{ac})-v_{in}(t)$ in Eq. 10) may be compared against a threshold value. If the powerline signal difference is less than the threshold value, the error correction unit 504 may infer that the detected variations in the powerline signal are attributable to random noise fluctuations and not to dynamic loading because of the time-varying current and the wire resistance. Accordingly, subsequent operations for estimating and applying the IR constant may not be executed. If the powerline signal difference is less than the threshold value, the error correction unit 504 can determine the estimate of the optimum IR constant as described above in Eq. 9a-Eq. 13. In some embodiments, the operations for evaluating the estimate of the time-varying optimum IR constant can be executed multiple times and the results can be averaged over multiple samples to enhance the estimation quality metric.

After error constant estimation unit 610 estimates the optimum IR constant, the multiplier 612 can multiply the estimated IR constant and the voltage drop $v_s(t)$ across the current sense resistor 410. The adder 608 can add the output of the multiplier 612 to the input powerline signal $v_{in}(t)$. The resultant corrected powerline signal $v_{ac}(t)$ is a more accurate representation of the input powerline signal 510 that is not corrupted by dynamic loading effects (e.g., wire resistance between the power supply and the ADC unit 124). The resultant corrected powerline signal $v_{ac}(t)$ is the zero cross signal that is provided to the filter unit 506 for subsequent processing as described above with reference to FIGS. 4 and 5.

Figure 7:
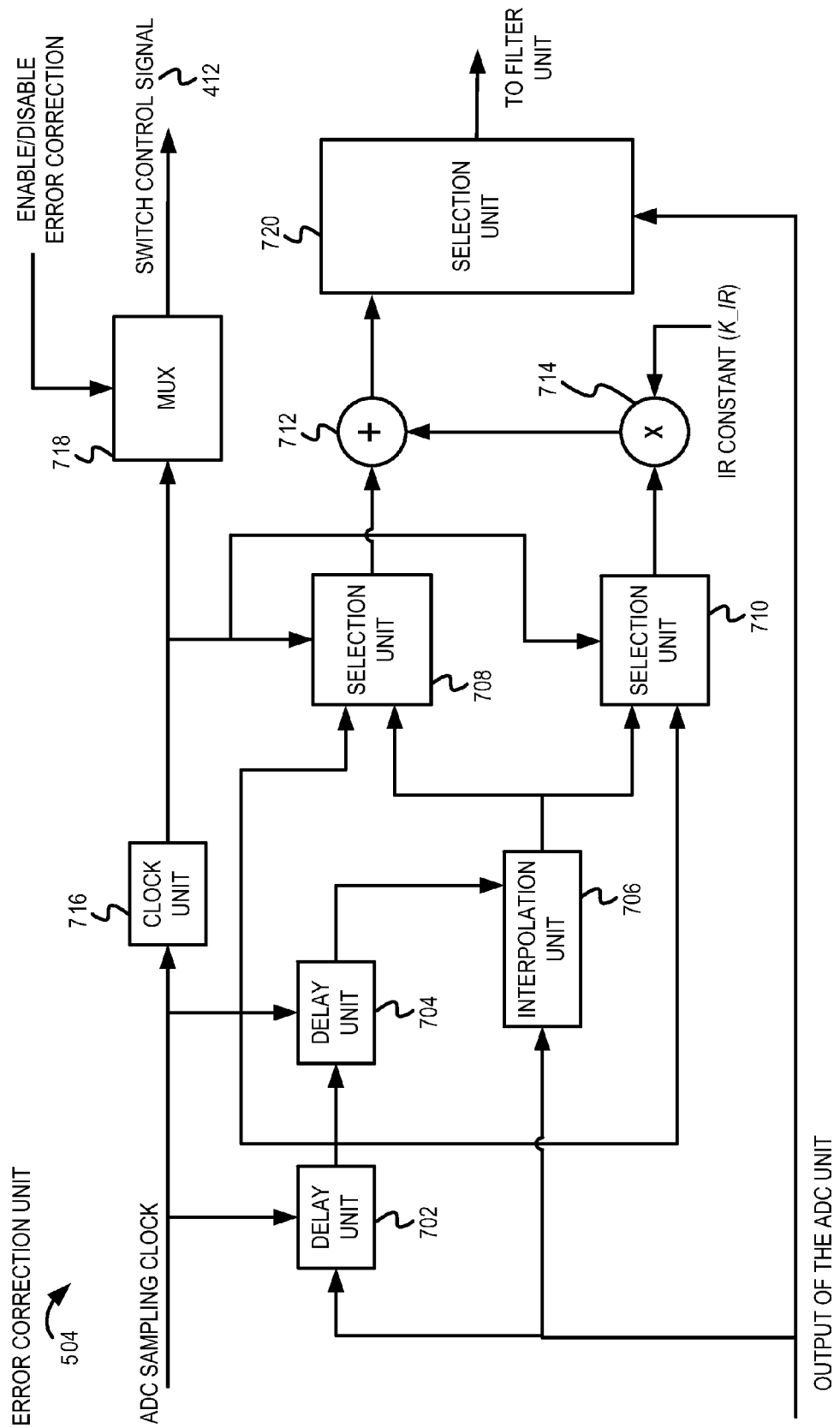
FIG. 7 is another embodiment of an error correction unit.

FIG. 7 is an example block diagram of one embodiment of the error correction unit 504. As discussed above in FIGS. 4 and 5, the operating mode selection unit 412 can be configured to periodically provide a powerline signal sample 510 and an error signal sample 518 (i.e., current sense sample) to the ADC unit 124 for digitizing and subsequent processing. Therefore, the output of the ADC unit 124 (and consequently the input of the error correction unit 504) is alternately a digitized powerline signal sample and a digitized error signal sample. FIG. 7 depicts delay units 702 and 704, an interpolation unit 706, selection units 708 and 710, an adder 712, and a multiplier 714. In some embodiments, the delay units 702 and 704 can be implemented as delay registers or Z-transform inverse units (depicted as $z^{-1}$ units in FIG. 7). In the example of FIG. 7, the delay units 702 and 704, the interpolation unit 706, and the selection units 708 and 710 can operate together to compute "missing samples" and de-interleave the samples (e.g., the powerline signal samples or the error signal samples) received from the ADC unit 124. The resultant de-interleaved samples can be provided to the input of the adder 712 and the multiplier 714. In some embodiments, operations of the selection units 708 and 710 for de-interleaving may be synchronized with the position of the switch of the operating mode selection unit 412 at the input of the ADC unit 124. This configuration can enable only two input pins to be used for the zero cross detector, irrespective of whether the zero cross detector is implemented within a dedicated PLC device (e.g., using printed safety capacitors) or within an embedded PLC device (e.g., using the dynamic loading correction).

Synchronization with the operating mode selection unit 412 may be achieved by configuring a clock unit 716 to apply a clock signal to the selection units 708 and 710. In some embodiments, the clock unit 716 can receive the ADC sampling frequency as an input and can generate the output clock signal at a frequency that is half the input ADC sampling frequency. In other embodiments, the clock unit 716 can generate the output clock signal at a frequency that is a suitable fraction of the input ADC sampling frequency. The output of the clock unit 716 is also provided to a multiplexer 718 that generates the switch control signal 412 depending on whether error correction operations are enabled or disabled.

After interpolation and de-interleaving, the samples that are directly provided from the selection unit 708 to the adder 712 are the powerline signal samples ("first signal"). As discussed above, the powerline signal samples include a desired 50/60 Hz zero cross signal and dynamic voltage (IxR) drops. In the example of FIG. 5, the powerline signal samples are generated when the operating mode selection unit 412 is configured to the amplifier bias voltage terminal 514. The samples that are provided from the selection unit 710 to the multiplier 714 are the error signal samples or current sense samples ("second signal"). As discussed above, the error signal samples are samples of the voltage across the current sense resistor 410. In the example of FIG. 5, the error signal samples are generated when the operating mode selection unit 412 is configured to the error signal terminal 512.

Then, as described with reference to FIG. 6, the multiplier 714 can multiply the second signal with the IR constant (K_IR) and can provide the resultant signal to the adder 712. The adder 712 can add the signal received from the multiplier 714 with the first signal. The signal at the output of the adder 712 comprises the 50/60 Hz zero cross signal and the dynamic voltage (IxR) drops are removed/minimized. The output of the adder 712 is provided to a selection unit 720. In addition, the output of the ADC unit 124 is also provided to the selection unit 720. As discussed above, the selection unit 720 can provide a corrected powerline signal (at the output of the adder 712) or can directly provide the output of the ADC unit 124 to the filter unit 506 depending on whether error correction operations are enabled or disabled. The selection unit 720 can bypass the error correction operations and provide the digitized powerline signal sample at output of the ADC unit 124 depending on the PLC application, the PLC device configuration, and whether the error correction operations are enabled or disabled.

Figure 8:
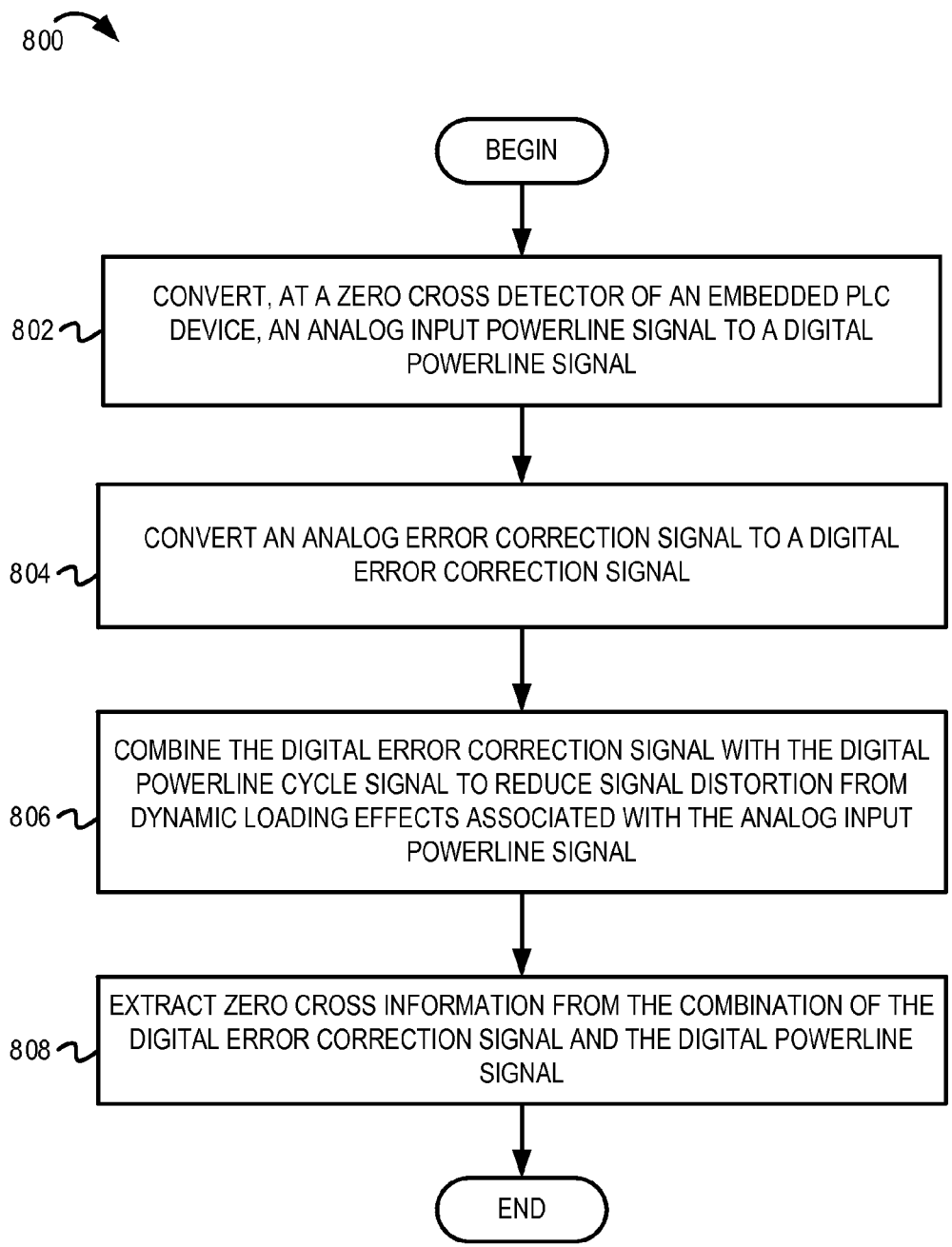
FIG. 8 is a flow diagram illustrating example operations of an embedded PLC device.

FIG. 8 is a flow diagram 800 illustrating example operations of an embedded PLC device. The flow 800 begins at block 802.

At block 802, a zero cross detector of an embedded PLC device converts an analog input powerline signal to a digital powerline signal. With reference to the example of FIG. 5, the ADC unit 124 converts an analog powerline signal sample to a digital powerline signal sample. The flow continues at block 804.

At block 804, an analog error correction signal is converted to a digital error correction signal. As depicted in FIG. 5, an operating mode selection unit 412 implemented at the input of the amplifier unit 122 can be configured to periodically provide a sample of the powerline signal and a sample of an error signal to the ADC unit 124. As discussed above, the powerline signal includes a zero cross signal and dynamic voltage drops. The error signal includes only the dynamic voltage drops. The ADC unit 124 can convert an analog error correction signal sample to a digital error correction signal sample. The flow continues at block 806.

At block 806, the digital error correction signal is combined with the digital powerline cycle signal to reduce signal distortion from dynamic loading effects associated with the analog input powerline signal. As described above with reference to FIGS. 5-7, the error correction unit 504 can determine an error constant (K_IR), multiply the error constant with the digital error correction signal, and add the resultant digital error correction signal with the digital powerline signal sample to reduce signal distortion from dynamic loading effects. The flow continues at block 808.

At block 808, zero cross information is extracted from the corrected digital powerline signal. In some embodiments, as described above with reference to FIGS. 4 and 5, the filter unit 506 can filter the corrected digital powerline signal to yield a zero cross signal at the powerline cycle frequency. A zero cross comparator unit 508 can compare the output of the filter unit 506 against hysteresis thresholds to minimize fluctuations in the zero cross information and to improve the accuracy of the zero cross information. In other embodiments, the corrected digital powerline signal can be directly provided to the zero cross comparison unit 508 to determine the zero cross information. The zero cross information can indicate powerline cycle zero crossing time instants. From block 808, the flow ends.

Figure 9:
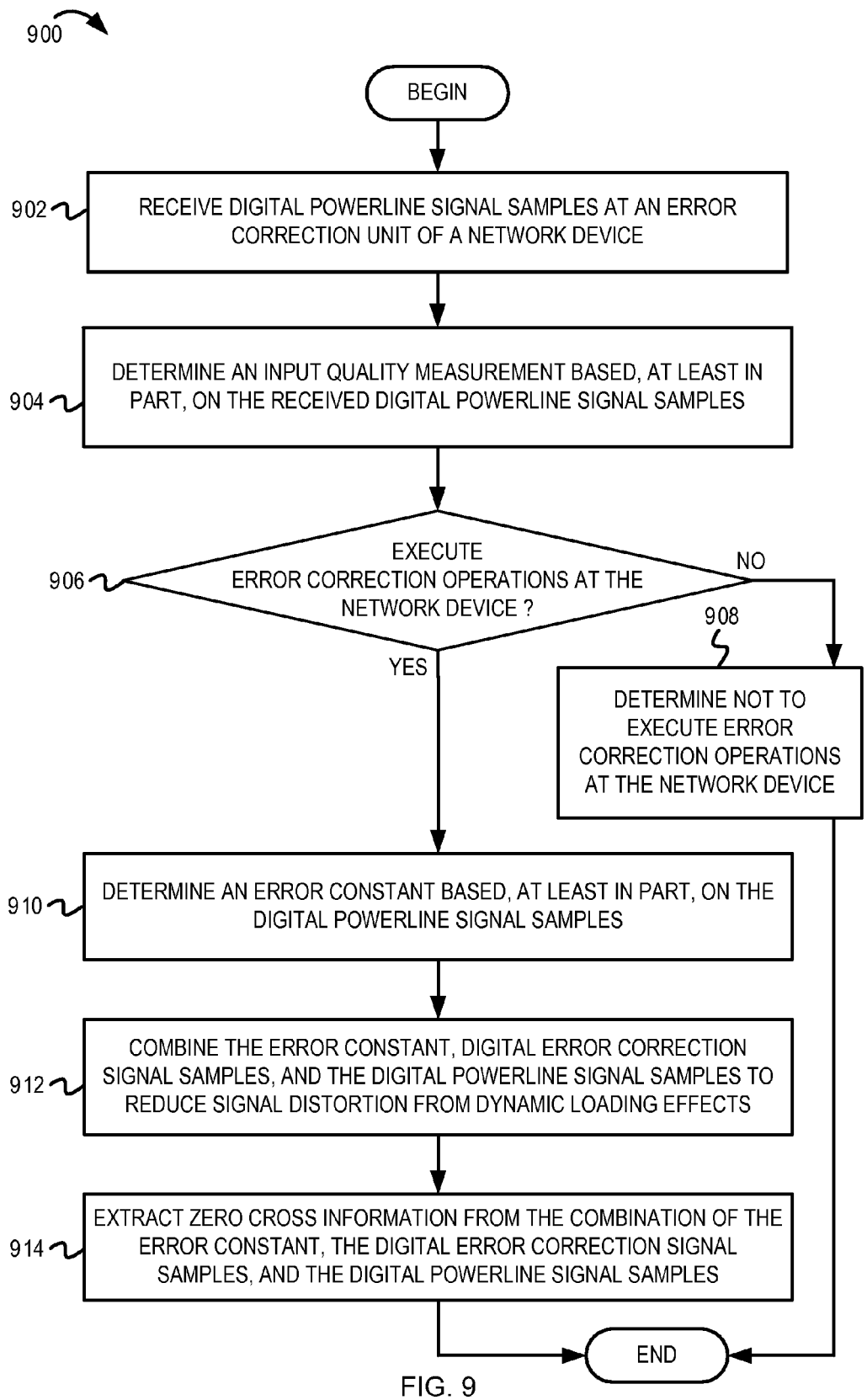
FIG. 9 is a flow diagram illustrating example operations for error correction in an embedded PLC device.

FIG. 9 is a flow diagram 900 illustrating example operations for error correction in an embedded PLC device. The flow 900 begins at block 902.

At block 902, digital powerline signal samples are received at an error correction unit of a network device. With reference to the example of FIG. 5, if a switch of the operating mode selection unit 412 is connected to a powerline signal terminal 514, the input powerline signal 510 is provided at the input of the zero cross detector 408. The amplifier unit 122 amplifies the powerline signal 510 and the ADC unit 124 converts an analog powerline signal 510 into a digital powerline signal sample. The digital powerline signal sample is then provided to the error correction unit 504. The flow continues at block 904.

At block 904, an input quality measurement is determined based, at least in part, on the digital powerline signal samples. Referring to the example of FIG. 6, the ICM estimation unit 602 can determine the input quality measurement using Eq. 3 and Eq. 4. The ICM can be used to determine if the input powerline signal has been corrupted by the dynamic voltage drops and whether subsequent error correction operations should be executed. The flow continues at block 906.

At block 906, it is determined whether error correction operations should be executed. In some embodiments, whether to enable or disable error correction operations may be determined based, at least in part, on a type of PLC application, a type of PLC device (e.g., whether a standalone/dedicated PLC device or an embedded PLC device), etc. In another embodiment, the input quality measurement can be used to determine whether to enable or disable error correction operations. With reference to the example of FIG. 6, the ICM comparison unit 604 can compare the input quality measurement against a corresponding threshold. If the input quality measurement is greater than or equal to the corresponding threshold, then it may be inferred that the input powerline signal 510 does not comprise dynamic loading and the error correction operations may be disabled. If it is determined that the input quality measurement is less than the corresponding threshold, then it may be inferred that the input powerline signal 510 does comprises dynamic loading and error correction operations may be enabled. If it is determined not to execute the error correction operations, the flow continues at block 908. Otherwise, if it is determined to execute the error correction operations, the flow continues at block 910.

At block 908, it is determined not to execute error correction operations at the network device. As described above with reference to FIGS. 4-8, when the error correction operations are not executed, the digital powerline signal sample at the output of the ADC unit 124 can be directly provided to the filter unit 506 for subsequent processing and extracting the zero cross information. From block 908, the flow ends.

At block 910, an error constant is determined based, at least in part, on the digital powerline signal samples. As described above with reference to FIG. 6 and Eqs. 5-13, the error constant estimation unit 610 can determine the error constant (K_IR). In one embodiment, the error constant estimation unit 610 can iteratively process a block of digital powerline signal samples to estimate the optimum value of the error constant. The error constant estimation unit 610 may use a suitable optimization technique to iteratively determine the value of the error constant, which minimizes the standard deviation of the error of the zero cross detection time with respect to a reference signal. In another embodiment, the error constant estimation unit 610 may estimate the error constant in a time-varying manner. The error constant estimation unit 610 may process consecutive powerline signal samples determined one period of the powerline cycle apart and consecutive difference signal samples (or current sense samples) determined one period of the powerline cycle apart. The error constant estimation unit 610 may combine these samples to determine the error constant. The flow continues at block 912.

At block 912, the error constant, digital error correction signal samples, and the digital powerline signal samples are combined to reduce signal distortion from dynamic loading effects. As depicted in FIG. 5, an operating mode selection unit 412 implemented at the input of the amplifier unit 122 can be configured to periodically provide a sample of the powerline signal and a sample of an error signal to the ADC unit 124. As discussed above, the powerline signal includes a zero cross signal and dynamic voltage drops. The error signal includes only the dynamic voltage drops. The ADC unit 124 can convert an analog error correction signal sample to a digital error correction signal sample. With reference to the example of FIG. 6, the multiplier 612 can multiply the digital difference signal samples with the error constant, while the adder 608 adds the output of the multiplier 612 with the digital powerline signal samples. The resultant corrected digital powerline signal is further processed to extract the zero cross information. The flow continues at block 914.

At block 914, zero cross information is extracted from the corrected digital powerline signal. In some embodiments, as described above with reference to FIGS. 4 and 5, the filter unit 506 can filter the corrected digital powerline signal to yield a zero cross signal at the powerline cycle frequency. A zero cross comparator unit 508 can compare the output of the filter unit 506 against hysteresis thresholds to minimize fluctuations in the zero cross information and to improve the accuracy of the zero cross information. In other embodiments, the corrected digital powerline signal can be directly provided to the zero cross comparison unit 508 to determine the zero cross information. The zero cross information can indicate powerline cycle zero crossing time instants. From block 914, the flow ends.

It should be understood that FIGS. 1-9 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. In some embodiments, the printed safety capacitors 110 and 112 can be used in conjunction with the ADC-based zero cross detector 104 in a PLC device that directly plugs into an AC power outlet of the PLC network, as described above with reference to FIGS. 1 and 2. However, in other embodiments, the zero cross detector 408 depicted in FIGS. 4 and 5 may also be implemented in conjunction with the printed safety capacitors for standalone or dedicated PLC devices/applications (e.g., a PLC adapter module). In the standalone PLC application, where the PLC device is directly connected to the AC outlet of the PLC network, the error correction unit 504 may not provide the control signal 516 to switch between sampling the powerline signal and the error signal. Instead, the bias reference voltage can be consistently applied to the amplifier unit 122. In some embodiments, the ADC-based zero cross detector 408 can be used without the printed safety capacitors 110 and 112 in an embedded PLC application (e.g., a PLC modem unit or a PLC-capable home appliance). For example, for an embedded PLC application, the zero cross detector 408 of FIGS. 4 and 5 can be used in conjunction with another coupling mechanism. Although not depicted in FIG. 5, in some embodiments, the output of the filter unit 506 may also be provided to a peak detector unit and a DC offset estimation unit, as described above with reference to FIG. 2. Furthermore, although not depicted in FIG. 5, in some embodiments, a DC offset unit may apply a DC offset to the amplifier unit 122, as described above with reference to FIG. 2.

Although examples refer to amplifying the analog representation of the AC powerline signal and providing the resultant amplified signal to the ADC unit, embodiments are not so limited. In other embodiments, the analog representation of the AC powerline signal may be attenuated and the resultant attenuated signal may be provided to the ADC unit. The zero cross detector may determine whether to amplify or attenuate the analog representation of the AC powerline signal based, at least in part, on the amplitude of the AC powerline signal and a conversion range of the ADC unit.

In some embodiments, for accurate detection of the zero cross time instants, the phase response of the zero cross detector 104 may be taken into consideration. In some embodiments, the detected zero cross time instants may not indicate the exact location of the powerline cycle zero crossing. Instead, the detected zero cross time instants may be at a fixed time offset from the exact location of the powerline cycle zero crossing. This may be because of phase shifts from the input circuit (e.g., series resistors, series printed safety capacitors, shunt capacitors, etc.) and other processing components (e.g., the filter unit 206 or 506) of the PLC device. In this embodiment, a phase correction can be estimated for each powerline cycle frequency (e.g., for 50 Hz powerline signals and for 60 Hz powerline signals) based on the position and interconnection between various circuit components. The appropriate phase correction can be applied to correct for the phase shifts. It is noted that the zero cross detector 408 may be similarly configured using the techniques described above for FIGS. 1-2.

In some embodiments, the zero cross detector 104 may not be aware of the geographic region in which it is deployed. For example, the zero cross detector 104 may not be aware of whether the powerline cycle frequency is 50 Hz or 60 Hz. Therefore, the zero cross detector 104 may support detection for both the 50 Hz powerline cycle frequency and the 60 Hz powerline cycle frequency. Although embodiments describe the zero cross detector 104 as comprising a single band pass filter that filters both 50 Hz powerline signals and 60 Hz powerline signals, various other embodiments are possible. In one embodiment, a digital zero cross signal at the output of the ADC unit 124 can be copied to two parallel paths. One path can comprise a band pass filter centered at 50 Hz, while the other path can comprise a band pass filter centered at 60 Hz. The output of each of the band pass filters can be provided to a magnitude selection unit. The magnitude selection unit can select the output signal with the preferred signal strength (e.g., highest signal strength). Alternately, the output of the 50 Hz band pass filter and the output of the 60 Hz band pass filter can be summed together. The summed result can be provided to the zero cross comparator unit 208 for extracting zero cross information. In another embodiment, as described in FIG. 2, the filter unit 206 can comprise one band pass filter that passes both the 50 Hz and 60 Hz powerline cycle frequencies. In another embodiment, the filter unit 206 can comprise a programmable band pass filter. The programmable band pass filter can be first programmed so that it is centered at 50 Hz. The programmable band pass filter can generate a 50 Hz output signal. The programmable band pass filter can then be programmed so that it is centered at 60 Hz. The programmable band pass filter can generate a 60 Hz output signal. The signal strength of the 50 Hz output signal can be compared against the signal strength of the 60 Hz output signal. The output signal with the preferred signal strength (e.g., higher signal strength) can be selected and provided as an input to the zero cross comparator unit 208 to extract the zero cross information. It is noted that the zero cross detector 408, the error correction unit 504, the filter unit 506, and/or the zero cross comparator unit 508 may be similarly configured using one of the techniques described above for FIGS. 1-2.

In some embodiments, the sampling rate of the ADC unit 124 may be much higher than the powerline cycle frequency. This high sampling rate may require high precision for feedback coefficients in the filter unit 206 (e.g., second order sections of the IIR filter) for filter stability. In some embodiments, the precision requirement of the filter unit 206 can be reduced by reducing the sampling rate of the input to the zero cross detector 104 by employing one or more low pass filtering and decimation stages. In another embodiment, a polyphase decimation filter can be implemented between the ADC unit 124 and the filter unit 206. The polyphase decimation filter can be used to drastically reduce the sampling rate by implementing a filter that uses a large number of filter coefficients. For example, the polyphase decimation filter can comprise a set of parallel polyphase filters, such that each polyphase filter operates using a smaller number of filter coefficients at a reduced input sampling rate. The output of these individual polyphase filters can summed together to yield the final output. In some embodiments, a cascaded integrator-comb (CIC) filter can be employed for decimation and interpolation. To operate as a decimator, the CIC filter typically comprises an N-stage integrator (configured to operate at a high rate), followed by an M-stage comb section which operates at the reduced rate. It is noted that the filter unit 506 may be similarly configured using the techniques described above for the filter unit 206.

Finally, in some implementations, one or more of the components described above in FIGS. 1-2 and 4-7 can be incorporated into embedded designs or can implemented on separate circuit boards or integrated circuits. In some embodiments, different components depicted in the FIGS. 1-2 and 4-7 may be implemented on-chip or off-chip. With reference to the example of FIG. 1, the zero cross detector 104 may be implemented as part of the PLC device while the coupling unit 102 may be external to the PLC device (e.g., on a separate circuit board, etc.). As another example, in FIG. 2, the zero cross detector AFE 202 and the zero cross detector digital processing unit 204 may each be implemented on separate circuit boards (or separate integrated circuits, etc.). As another example, with reference to FIG. 5, the error correction unit 504 may be implemented separately from other components of the zero cross detector. In addition to the examples described herein, various other implementations are possible. Although various examples have been described for error correction in the PLC system described above with reference to FIGS. 4-7, embodiments are not so limited. In other embodiments, the error correction functionality can be implemented in various other types of systems (e.g., various other types of PLC systems) for reducing the signal distortion resulting from the dynamic loading effects on the powerline cycle waveform and providing a relatively clean and stable input powerline cycle waveform to one or more signal processing blocks of the system at the next signal processing stage.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
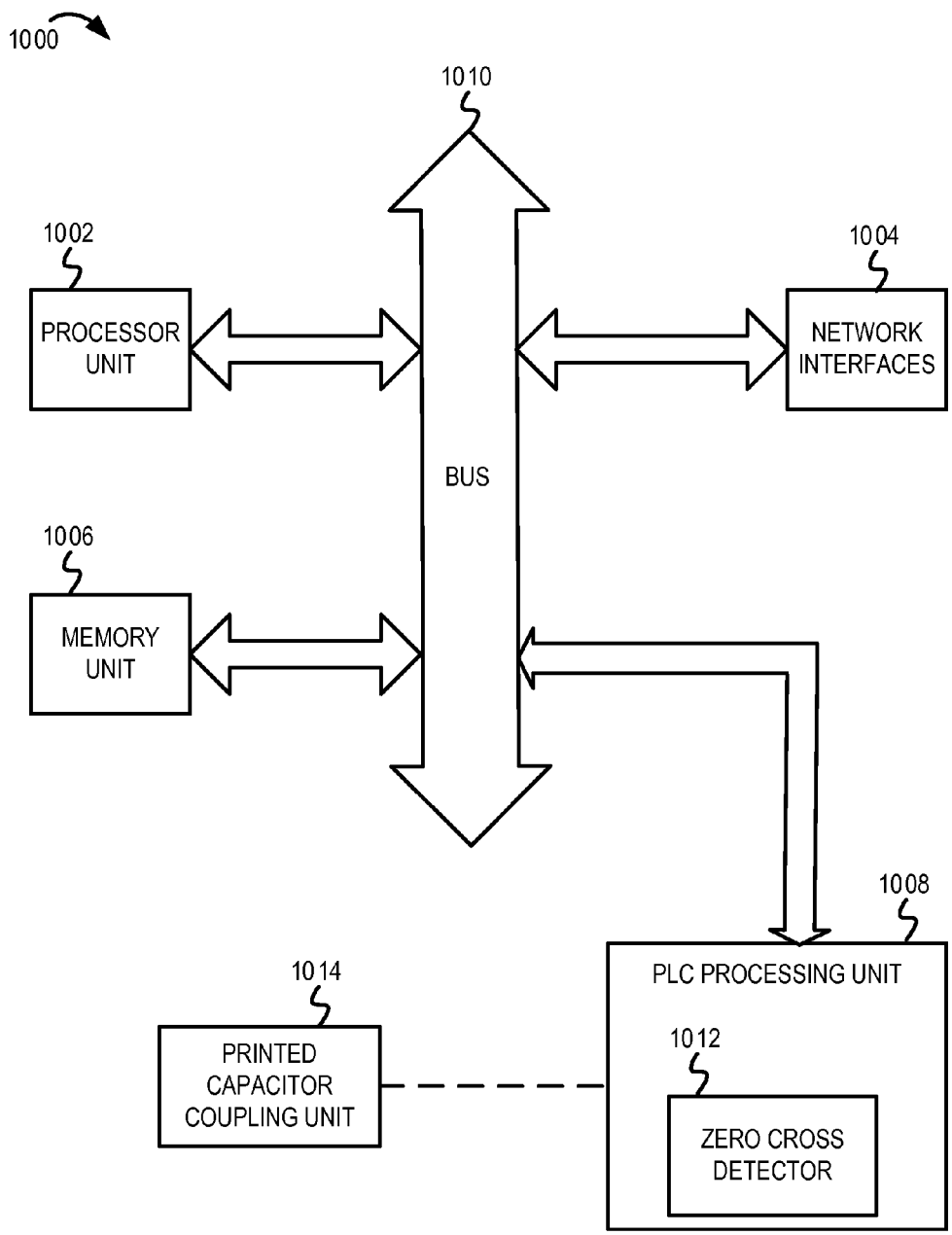
FIG. 10 is a block diagram of one embodiment of an electronic device including mechanism for zero cross detection.

FIG. 10 is a block diagram of one embodiment of an electronic device 1000 including a mechanism for zero cross detection in a powerline communication (PLC) device. The electronic device 1000 comprises a PLC processing unit 1008. The PLC processing unit 1008 comprises a zero cross detector 1012. FIG. 10 also depicts a printed capacitor coupling unit 1014. The printed capacitor coupling unit 1014 is coupled to the PLC processing unit 1008 using dashed lines. Depending on the application of the electronic device 1000, the PLC processing unit 1008 may or may not be coupled with the printed capacitor coupling unit 1014. In some implementations, the electronic device 1000 may be a standalone or dedicated PLC device, such as a PLC adapter module. In this implementation, the electronic device 1000 can be directly connected to an AC power outlet of a PLC network. In this embodiment, the printed capacitor coupling unit 1014 may be coupled with the PLC processing unit 1008. The printed capacitor coupling unit 1014 can be fabricated on a PCB and may be external to an integrated circuit that comprises functionality of the zero cross detector 1012. The printed capacitor coupling unit 1014 can comprise printed safety capacitors in series with the line and neutral wires of the PLC network. The printed capacitor coupling unit 1014 can isolate a high-voltage input powerline signal from low-voltage components of the PLC processing unit 1008, as described above in FIG. 1. The zero cross detector 1012 can convert a received low-voltage powerline signal into the digital domain and use the digitized powerline signal to determine the zero cross information, as described above in FIGS. 1-3 and 9.

In another implementation, the electronic device 1000 can be implemented as part of (i.e., embedded within) another electronic device or communication system. For example, the electronic device 1000 can be embedded within one of a desktop computer, laptop computer, a tablet computer, a mobile phone, a smart appliance, a powerline communication device, a gaming console, a network bridging device, an access point, or other electronic system comprising a communication unit configured for powerline communication. In this implementation, the PLC processing unit 1008 may not be coupled with the printed capacitor coupling unit 1014. The PLC processing unit 1008 may receive an AC zero cross signal with dynamic loading from a power supply processing unit of the encompassing communication system. The zero cross detector 1012 can execute functionality described above in FIGS. 3-9 to digitize the received zero cross signal, eliminate/minimize the dynamic loading, and to determine the zero cross information from the resultant zero cross signal. For example, the zero cross detector 1012 can control a switch to alternate between sampling a digitized distorted zero cross signal and sampling a digitized error signal. The distorted zero cross signal may include the zero cross information and dynamic loading; while the error signal may only include the dynamic loading. The zero cross detector 1012 can combine the signal samples to eliminate/minimize the dynamic loading.

The electronic device 1000 also includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). For example, in addition to the processor unit 1002 coupled with the bus 1010, the communication unit 1008 may comprise at least one additional processor unit. The processor unit 1002, the memory unit 1006, and the network interfaces 1004 are coupled to the bus 1010. Although illustrated as being coupled to the bus 1010, the memory unit 1006 may be coupled to the processor unit 1002. For example, in addition to the processor unit 1002 coupled with the bus 1010, the PLC device 1008 may comprise at least one additional processor unit.

While the embodiments are described with reference to various implementations and exploitations, it will be understood that these embodiments are illustrative and that the scope of the inventive subject matter is not limited to them. In general, techniques for extracting zero cross information in a powerline communication (PLC) circuit as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A network device comprising:
   a printed capacitor coupling unit configured to:
      receive an AC powerline signal at a first voltage level from a powerline communication network, and
      provide the AC powerline signal at a second voltage level to a zero cross detector of the network device, wherein the second voltage level is lower than the first voltage level; and
   the zero cross detector coupled with the printed capacitor coupling unit, the zero cross detector comprising:
      an amplifier unit configured to vary an amplitude of the AC powerline signal;
      an analog-to-digital converter (ADC) unit coupled with the amplifier unit, the ADC unit configured to convert an analog representation of the AC powerline signal to a digital representation of the AC powerline signal, and
      a digital processing unit coupled with the ADC unit, the digital processing unit configured to extract zero cross information from the digital representation of the AC powerline signal.

2. The network device of claim 1, wherein
   the printed capacitor coupling unit comprises a first printed capacitor and a second printed capacitor,
   a first terminal of the first printed capacitor is coupled with a first input of the network device,
   a second terminal of the first printed capacitor is coupled with a first input terminal of the zero cross detector,
   a first terminal of the second printed capacitor is coupled with a second input of the network device, and
   a second terminal of the second printed capacitor is coupled with a second input terminal of the zero cross detector.

3. The network device of claim 2, wherein
   the printed capacitor coupling unit further comprises a first shunt capacitor and a second shunt capacitor,
   a first terminal of the first shunt capacitor is coupled with the second terminal of the first printed capacitor,
   a first terminal of the second shunt capacitor is coupled with the second terminal of the second printed capacitor, and
   a second terminal of the first shunt capacitor is coupled with a second terminal of the second shunt capacitor and with a ground terminal of the network device.

4. The network device of claim 2, wherein
   the network device is implemented on a multi-layer printed circuit board,
   the first printed capacitor is implemented on a first layer of the multi-layer printed circuit board, and
   the second printed capacitor is implemented on a second layer of the multi-layer printed circuit board.

5. The network device of claim 1, wherein the digital processing unit comprises a filter unit coupled with the ADC unit, the filter unit configured to filter the digital representation of the AC powerline signal received from the ADC unit.

6. The network device of claim 5, wherein the digital processing unit further comprises a zero cross comparator unit coupled with the filter unit, the zero cross comparator unit configured to:
   compare the filtered digital representation of the AC powerline signal against a threshold to determine the zero cross information.

7. The network device of claim 5, wherein the digital processing unit further comprises a peak detector unit coupled with the filter unit, the peak detector unit configured to:
   determine a gain level for the amplifier unit of the zero cross detector based, at least in part, on a signal strength of the filtered digital representation of the AC powerline signal.

8. The network device of claim 5, wherein the digital processing unit further comprises a DC offset estimation unit coupled with the filter unit, the DC offset estimation unit configured to:
   determine a digital DC offset for the amplifier unit of the zero cross detector based, at least in part, on a conversion range of the ADC unit and the filtered digital representation of the AC powerline signal.

9. The network device of claim 5, wherein
   the digital processing unit further comprises a zero cross comparator unit, a peak detector unit, and a DC offset estimation unit,
   the zero cross comparator unit is coupled with the filter unit, the zero cross comparator unit configured to compare the filtered digital representation of the AC powerline signal against a threshold to determine the zero cross information, the peak detector unit is coupled with the filter unit, the peak detector unit configured to determine a gain level for the amplifier unit of the zero cross detector based, at least in part, on a signal strength of the filtered digital representation of the AC powerline signal, and the DC offset estimation unit is coupled with the filter unit, the DC offset estimation unit configured to determine a digital DC offset for the amplifier unit based, at least in part, on a conversion range of the ADC unit and the filtered digital representation of the AC powerline signal.

10. The network device of claim 9, wherein the zero cross detector further comprises a DC offset unit, the DC offset unit configured to:

receive the digital DC offset;

convert the digital DC offset into an analog DC offset; and apply the analog DC offset to the amplifier unit.

11. The network device of claim 1, wherein the digital processing unit comprises at least one of a zero cross comparator unit, a peak detector unit, and a DC offset estimation unit, the zero cross comparator unit is coupled with the ADC unit, the zero cross comparator unit configured to compare the digital representation of the AC powerline signal against a threshold to determine the zero cross information;

the peak detector unit is coupled with the ADC unit, the peak detector unit configured to determine a gain level for the amplifier unit of the zero cross detector based, at least in part, on a signal strength of the digital representation of the AC powerline signal; and the DC offset estimation unit is coupled with the ADC unit, the DC offset estimation unit configured to determine a digital DC offset for the amplifier unit based, at least in part, on a conversion range of the ADC unit and the digital representation of the AC powerline signal.

12. A method for extracting zero cross information at a network device, the method comprising:

receiving, by a printed capacitor coupling unit of the network device, an AC powerline signal at a first voltage level from a powerline communication network;

providing the AC powerline signal at a second voltage level from the printed capacitor coupling unit to a zero cross detector of the network device, wherein the second voltage level is lower than the first voltage level;

varying, by an amplifier unit of the zero cross detector, an amplitude of the AC powerline signal;

converting, by an analog-to-digital converter (ADC) unit of the zero cross detector, an analog representation of the AC powerline signal to a digital representation of the AC powerline signal; and extracting, by a digital processing unit of the zero cross detector, zero cross information from the digital representation of the AC powerline signal.

13. The method of claim 12 further comprising:

filtering the digital representation of the AC powerline signal prior to extracting the zero cross information from the digital representation.

14. The method of claim 12, further comprising:

comparing the digital representation of the AC powerline signal against a threshold to determine the zero cross information.

15. A network device comprising:

means for receiving an AC powerline signal at a first voltage level from a powerline communication network;

means for providing the AC powerline signal at a second voltage level, wherein the second voltage level is lower than the first voltage level;

means for varying an amplitude of the AC powerline signal;

means for converting an analog representation of the AC powerline signal at the second voltage level to a digital representation of the AC powerline signal; and means for extracting zero cross information from the digital representation of the AC powerline signal.

16. The network device of claim 15, further comprising:

means for filtering the digital representation of the AC powerline signal prior to extracting the zero cross information from the digital representation.

17. The network device of claim 15, further comprising:

means for comparing the digital representation of the AC powerline signal against a threshold to determine the zero cross information.

* * * * *